US012725282B2

(12) United States Patent
Presse et al.

(10) Patent No.: US 12,725,282 B2
(45) Date of Patent: Sep. 1, 2026

(54) SYSTEMS AND METHODS FOR SIMULTANEOUS SINGLE PARTICLE TRACKING, PHASE RETRIEVAL AND PSF RECONSTRUCTION

(71) Applicants: Steve Presse, Scottsdale, AZ (US); Mohamadreza Fazel, Tempe, AZ (US); Zeliha Kilic, Memphis, TN (US)

(72) Inventors: Steve Presse, Scottsdale, AZ (US); Mohamadreza Fazel, Tempe, AZ (US); Zeliha Kilic, Memphis, TN (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 243 days.

(21) Appl. No.: 18/425,056

(22) Filed: Jan. 29, 2024

(65) Prior Publication Data

US 2024/0257362 A1 Aug. 1, 2024

Related U.S. Application Data

(60) Provisional application No. 63/441,673, filed on Jan. 27, 2023.

(51) Int. Cl.
*G06T 7/277* (2017.01)
*G01N 15/1429* (2024.01)

(52) U.S. Cl.
CPC ......... *G06T 7/277* (2017.01); *G01N 15/1429* (2013.01); *G06T 2207/10056* (2013.01);
(Continued)

(58) Field of Classification Search
USPC ........................................................ 382/103
See application file for complete search history.

(56) References Cited

U.S. PATENT DOCUMENTS 9,538,157 B2 * 1/2017 Piestun ................ H04N 13/204
9,560,338 B2 * 1/2017 Piestun ..................... G06T 7/77
(Continued)

FOREIGN PATENT DOCUMENTS

WO WO-2024159127 A1 * 8/2024 ......... G01N 15/1456

OTHER PUBLICATIONS

Petrov el al., Measurement-based estimation of global pupil function in 3D localization microscopy, ARXIV ID: 1705.09694, Diigital Object Identifier: 10.1364/OE.25.007945, pp. 1-14 (Year: 2017).*
(Continued)

*Primary Examiner* — Ishrat I Sherali
(74) *Attorney, Agent, or Firm* — Polsinelli PC

(57) ABSTRACT

3D particle tracking and localization provide direct means to monitor details within nano-scale environments. However, a major shortcoming of 3D techniques is the sample induced aberrations due to inhomogeneous refractive index, resulting in distortion of point spread functions (PSFs), which are an important measurement tool required for these tasks in the field. This issue is particularly important when using pre-calibrated PSFs that do not take into account the sample induced aberrations. A system incorporates a Bayesian framework for simultaneous particle tracking and PSF inference directly from a given data. The system is data efficient by taking into account existing sources of uncertainty, such as uncertainty in the shape of the PSF, which is often ignored. The system is benchmarked using a wide range of synthetic and experimental data.

18 Claims, 18 Drawing Sheets
(12 of 18 Drawing Sheet(s) Filed in Color)

(52) U.S. Cl.
CPC ............... *G06T 2207/10064* (2013.01); *G06T 2207/20076* (2013.01); *G06T 2207/30241* (2013.01)

(56) References Cited

U.S. PATENT DOCUMENTS

| | | | | |
|---|---|---|---|---|
| 11,960,102 | B2 * | 4/2024 | Xu | G01N 21/6458 |
| 12,210,167 | B2 * | 1/2025 | Xu | G01N 21/6458 |
| 2014/0015935 | A1 * | 1/2014 | Piestun | H04N 13/204<br>348/46 |
| 2015/0035946 | A1 * | 2/2015 | Piestun | G06T 7/77<br>348/46 |
| 2024/0319097 | A1 * | 9/2024 | Ma | G02B 21/367 |
| 2025/0111257 | A1 * | 4/2025 | Goodman | G06N 7/01 |

OTHER PUBLICATIONS

Relich II, Single Particle Tracking Analysis Techniques for Live Cell Nanoscopy, DISSERTATION , Doctor of Philosophy of Physics, University of New Mexico, pp. 1-149. (Year: 2017).*

Wendy K. et al.., A Parallel Evolutionary Multiple-Try Metropolis Markov Chain Monte Carlo Algorith for Sampling Spatial Partitions, arXiv:2007.11461v1 [stat.CO] Jul. 22, 2020. pp. 1-27. (Year: 2020).*

Von Diexmann, L. et al. "Three-Dimensional Localization of Single Molecules for Super-Resolution Imaging and Single-Particle Tracking," Chemical Reviews, 117(11), Feb. 2, 2017, pp. 7244-7275.

Fazel, M. et al., "Fluorescence Microscopy: A statistics-optics perspective.," Reviews of Modern Physics, vol. 96, No. 2, Apr.-Jun. 2024, pp. 025003-1-025003-74.

Xu, F. et al., "Three-dimensional nanoscopy of whole cells and tissues with in situ point spread function retrieval," Nature Methods, vol. 17, May 2020, pp. 531-540.

Sage, D. et al., "Super-resolution fight club: assessment of 2D and 3D single-molecule localization microscopy software," Nature Methods, vol. 16,May 2019, pp. 387-395.

Fazel, M. et al., "Analysis of super-resolution single molecule localization microscopy data: A tutorial," AIP Advances 12, Jan. 3, 2022, 30 pages.

Shechtman, Y. et al., Precise Three-Dimensional Scan-Free Multiple-Particle Tracking Over Large Axial Ranges with Tetrapod Point Spread Functions. Nano Letters, May 5, 2015, pp. 4194-4199.

Manzo, C. et al., "A review of progress in single particle tracking: from methods to biophysical insights," Reports on Progress in Physics 78, Oct. 28, 2015, pp. 1-29.

Shen, H. et al., "Single Particle Tracking: from Theory to Biophysical Applications," Chemical Reviews 117, May 18, 2017, pp. 7331-7376.

Xu, L. et al., BNP-Track: A framework for multi-particle super-resolved tracking, Apr. 15, 2023, pp. 1-30.

Sgouralis, I. et al, "Dynamic superresolution by Bayesian nonparametric image processing," Biorxiv: the Preprint Server for Biology, Apr. 5, 2023, pp. 1-16.

Schwertner, M. et al., "Characterizing specimen induced aberrations for high NA adaptive optical microscopy," Optics Express, vol. 12, No. 26, Dec. 27, 2004, pp. 6540-6552.

Ji, N. (2017). "Adaptive optical fluorescence microscopy," Nature Methods, vol. 14, No. 4, Apr. 2017, pp. 374-380.

Liu, T. L. et al., "Observing the cell in its native state: Imaging subcellular dynamics in multicellular organisms," Science 360, Apr. 20, 2018, pp. 1-13.

Prabhat, P. et al., "Simultaneous Imaging of Different Focal Planes in Fluorescence Microscopy for the Study of Cellular Dynamics in Three Dimensions," IEEE Transactions on Nanobioscience, vol. 3, No. 4, Dec. 2004, pp. 237-242.

Ram, S., et al., "High Accuracy 3D Quantum dot Tracking with Multifocal Plane Microscopy for the Study of Fast Intracellular Dynamics in Live Cells," Biophysical Journal, vol. 95, Dec. 2008, pp. 6025-6043.

Tahmasbi, A., et al., "Designing the focal plane spacing for multifocal plane microscopy," Optics Express, vol. 22, No. 14, Jun. 30, 2014, pp. 16706-16721.

Huang, B. et al., "Three-Dimensional Super-Resolution Imaging by Stochastic Optical Reconstruction Microscopy," Science, vol. 319, Feb. 8, 2008, pp. 810-813.

Pavani, S. R. P. et al., "Three-dimensional, single-molecule fluorescence imaging beyond the diffraction limit by using a double-helix point spread function," Proceedings of the National Academy of Sciences, vol. 106, No. 9, Mar. 3, 2009, pp. 2995-2999.

Baddeley, D. et al., "Three-Dimensional Sub-100 nm Super-Resolution Imaging of Biological Samples Using a Phase Ramp in the Objective Pupil," Nano Research, 4, Feb. 12, 2011, pp. 589-598.

Lew, M. D. et al., "Corkscrew point spread function for far-field three-dimensional nanoscale localization of pointlike objects," Optics Letters, vol. 36, No. 2, Jan. 15, 2011, pp. 202-204.

Prasad, S. "Rotating point spread function via pupil-phase engineering," Optics Letters, vol. 38, No. 4, Feb. 13, 2013, pp. 585-587.

Shechtman, Y. et al., "Optimal Point Spread Function Design for 3D Imaging," Physical Review Letters, Sep. 26, 2014, pp. 133902-1-133902-5.

Jia, S. et al., "Isotropic three-dimensional super-resolution imaging with a self-bending point spread function," Nature Photonics, vol. 8, Apr. 2014, pp. 302-306.

Weiss, L. E. et al., "Three-dimensional localization microscopy in live flowing cells," Nature Nanotechnology, vol. 15, Jun. 2020, pp. 500-506.

Hanser, B. M., et al., "Phase-retrieved pupil functions in wide-field fluorescence microscopy," Journal of Microscopy, vol. 216, Pt 1, May 26, 2004, pp. 32-48.

Liu, S. et al., "Three dimensional single molecule localization using a phase retrieved pupil function," Optics Express, vol. 21, No. 24, Dec. 2, 2013, pp. 29462-29487.

Aristov, A. et al., "ZOLA-3D allows flexible 3D localization microscopy over an adjustable axial range," Nature Communications, 2018, pp. 1-8.

Ferdman, B. et al., "VIPR: vectorial implementation of phase retrieval for fast and accurate microscopic pixel-wise pupil estimation," Optics Express, vol. 28, No. 7, Mar. 30, 2020, pp. 10179-10198.

Li, Y. et al., "Real-time 3D single-molecule localization using experimental point spread functions," Nature Methods, vol. 15, No. 5, May 2018, pp. 367-369.

Smith, C. S. et al., "Fast, single-molecule localization that achieves theoretically minimum uncertainty," Nature Methods, vol. 7, No. 5, May 2010, pp. 373-375.

Fazel, M. et al., "Bayesian multiple emitter fitting using reversible jump Markov chain Monte Carlo," Scientific Reports, Sep. 24, 2019, 10 pages.

Rasmussen, C. E., "Gaussian Processes in Machine Learning," In Summer school on machine learning, vol. 3176, pp. 63-71.

Bryan, J. S. et al., "Inferring effective forces for Langevin dynamics using Gaussian processes," The Journal of Chemical Physics, 152, Mar. 25, 2020, pp. 124106-1-124106-14.

Fazel, M. et al., "High resolution fluorescence lifetime maps from minimal photon counts," Biophysical Journal, Feb. 20, 2022, p. 141a.

Metropolis, N., "Equation of state calculations by fast computing machines," The Journal of Chemical Physics, 21(6), Jun. 1953, pp. 1087-1092.

Hastings, W. K., "Monte Carlo sampling methods using Markov chains and their applications," Biometrika, vol. 57, No. 1, Apr. 1970, pp. 97-109.

Fazel, M. et al. "High-precision estimation of emitter positions using Bayesian grouping of localizations," Nature Communications, Nov. 22, 2022, pp. 1-11.

Fazel, M. et al., "Fluorescence lifetime: Beating the IRF and interpulse window," Biophysical Journal 122, Feb. 21, 2023, pp. 672-683.

Bryan IV, J. S. et al., "Diffraction-limited molecular cluster quantification with Bayesian nonparametrics," Nature Computational Science, 2(2), Jul. 21, 2022, pp. 1-20.

(56) References Cited

OTHER PUBLICATIONS

Bélisle, C. J., et al., "Hit-and-Run Algorithms for Generating Multivariate Distributions," Mathematics of Operations Research, vol. 18, No. 2, May 1993, pp. 255-266.
Chen, M. H. et al., "General hit-and-run Monte Carlo sampling for evaluating multidimensional integrals," Operations Research Letters 19, Feb. 1, 1996, pp. 161-169.
Saleh, B. E., & Teich, M. C. (2019). Fundamentals of photonics. john Wiley & sons.
Deschout, H. et al., "Precisely and accurately localizing single emitters in fluorescence microscopy," Nature Methods, vol. 11, No. 3, Mar. 2014, pp. 253-266.
Bovik, A. "The Essential Guide to Image Processing," Academic Press, Second Edition, 14 pages.
Liu, J. S. et al., "Monte Carlo Strategies in Scientific Computing," vol. 10, Springer, 8 pages.
Descloux, A., et al., "Combined Multi-Plane Phase Retrieval and Super-Resolution optical Fluctuation Imaging for 4D Cell Milcroscopy," Nature Photonics, 12(3), Mar. 12, 2018, pp. 165-172.
Mojiri S. et al., "Rapid multi-plane phase-contrast microscopy reveals torsional dynamics in flagellar motion," Biomedical Optics Express 3170, vol. 12, No. 6, Jun. 1, 2021, pp. 3169-3180.
Edelstein, A. et al., "Computer control of microscopes using µManager," Current Protocols in Molecular Biology, Supplement 92, Oct. 17, 2010, 17 pages.
Huang, F. et al., "Video-rate nanoscopy using sCMOS camera-specific single-molecule localization algorithms," Nature Methods vol. 10, No. 7, Jul. 2013, pp. 653-658.
Tavakoli, M. et al, "Pitching single-focus confocal data analysis one photon at a time with Bayesian nonparametrics," Physical Review X, 10. Jan. 30, 2020, 26 pages.
Jazani, S., "Single-Focus Confocal Data Analysis with Bayesian Nonparametrics," ProQuest, Jul. 2020, 211 pages.
Liu, S. et al., "Universal inverse modelling of point spread functions for SMLM localization and microscope characterization," Oct. 26, 2023, 36 pages.

* cited by examiner

SYSTEMS AND METHODS FOR SIMULTANEOUS SINGLE PARTICLE TRACKING, PHASE RETRIEVAL AND PSF RECONSTRUCTION

CROSS-REFERENCE TO RELATED APPLICATIONS

This is a U.S. Non-Provisional Patent Application that claims benefit to U.S. Provisional Patent Application Ser. No. 63/441,673 filed 27 Jan. 2023, which is herein incorporated by reference in its entirety.

GOVERNMENT SUPPORT

This invention was made with government support under R01 GM130745 and R01 GM134426 awarded by the National Institutes of Health. The government has certain rights in the invention.

FIELD

The present disclosure generally relates to particle localization, and in particular, to a system and associated methods for simultaneous single particle tracking, phase retrieval and PSF reconstruction using a Bayesian framework.

BACKGROUND 3D particle tracking and localization provide direct means to monitor biomolecular processes within nano-scale environments. However, optical aberrations due to inhomogeneous refractive indices are a major shortcoming in probing these processes in situ. In particular, point spread functions (PSF) may be distorted resulting in poor localization and linking across frames. This issue is particularly important when using pre-calibrated PSFs that do not take into account sample induced aberrations. The sample induced aberrations are often removed using experimental techniques such as adaptive optics (AO) by introducing new optical components to microscope setups.

It is with these observations in mind, among others, that various aspects of the present disclosure were conceived and developed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

Figure 1A:
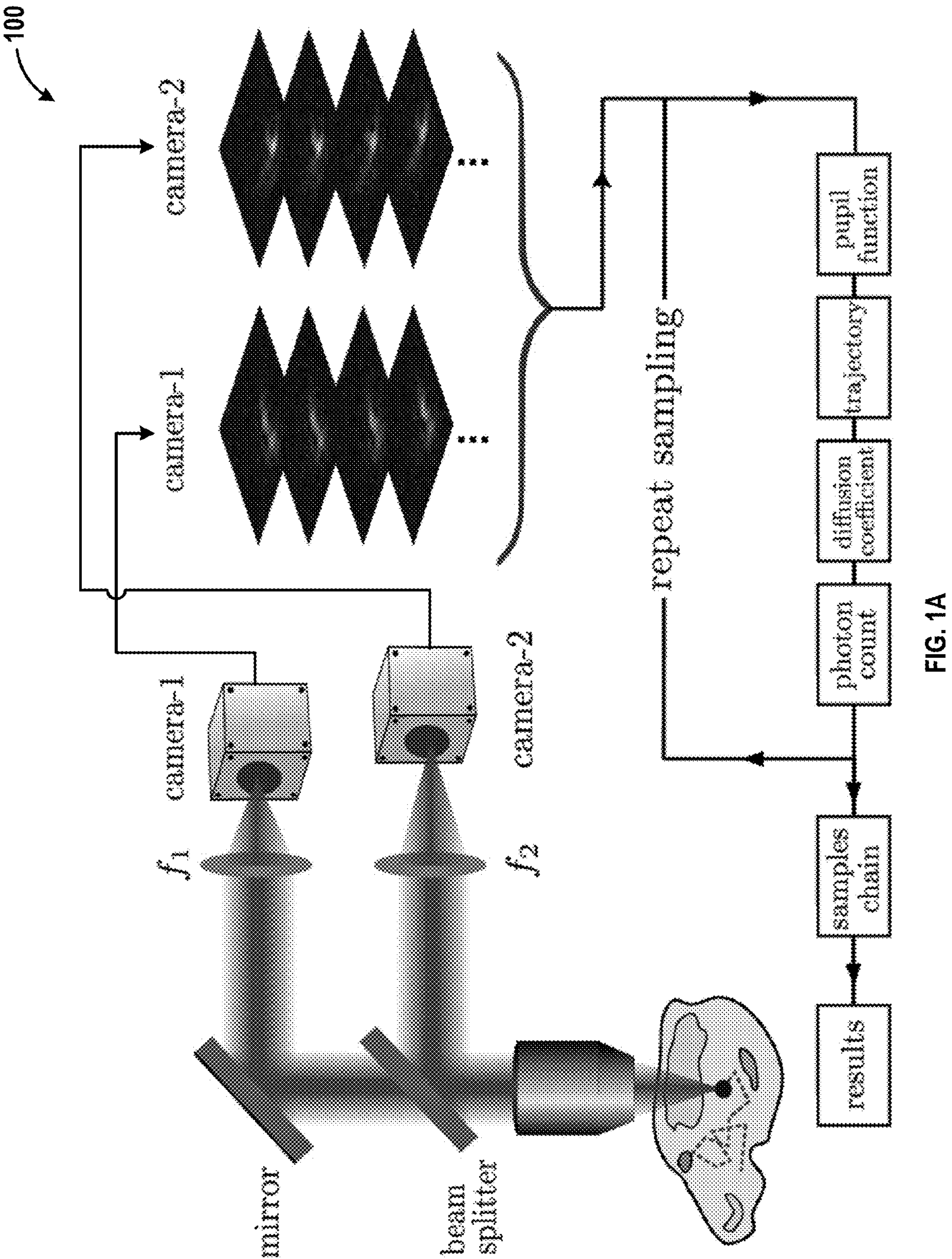
FIG. 1A is a conceptual illustration showing particle localization and tracking of a dynamic particle observed using a bi-plane microscope under a computer-implemented particle localization and tracking framework outlined herein.

The present disclosure provides a computer-implemented system and associated methods for simultaneous particle tracking, phase retrieval, and PSF reconstruction directly from a given data set. The system leverages a Bayesian framework for simultaneous particle tracking, phase retrieval, and PSF reconstruction directly from a given data set as an alternative to AO techniques without requiring additional hardware for an associated optical system. Moreover, the system is data efficient by rigorously propagating uncertainty from all existing sources in the problem, such as the uncertainty in the shape of PSF, often ignored. The methods are benchmarked using a wide range of synthetic and experimental data.

1. Related Work and Context

The 3D nature of biological samples begs the development of 3D fluorescent microscopy techniques. Particularly, it is of interest to observe and track fluorescence particles within subcellular environments characterized with inhomogeneous optical properties. As a result of these properties, the wavefront of fluorescent light traveling within these environments is significantly perturbed, resulting in distortion of the point spread function (PSF), which in turn hinders precise 3D particle localization and thus tracking.

Adaptive optics (AO) is a standard set of experimental techniques in fluorescence microscopy to correct sample induced wavefront distortions. AO techniques correct wavefront aberrations by scanning guide stars across the specimen. The corrections are achieved by embedding deformable mirrors or spatial light modulators in the excitation and detection paths.

Another major obstacle in 3D particle localization and tracking is the localization ambiguity in the axial direction due to the symmetry of the PSF with respect to the focal plane. This issue is often addressed by use of either multi-focal or PSF engineering techniques. The multi-focal technique breaks the symmetry along the axial direction by providing multiple slices of the PSF in this direction with known separations. On the other hand, to obtain precise 3D locations, the PSF engineering techniques achieve rapidly changing PSFs as a function of axial location by introducing designed perturbations to the wavefront.

In addition to these experimental solutions, there exist complementary computational solutions. In the computational front, it is often convenient to work within the Fourier domain where the wavefront is represented by a complex pupil function. The pupil function quantifies changes in the phase and amplitude of the waves due to sample induced aberrations, instrument imperfections and PSF engineering. In 3D particle localization and tracking, the pupil function is often obtained using phase retrieval techniques such as Gerchberg-Saxton and maximum likelihood techniques. These phase retrieval techniques often use a stack of calibration image frames acquired from beads placed on the microscope stage and incrementing its location below and above the focal plane. The calibrated pupil function can then be used to generate a pre-calibrated PSF, which is in turn employed for particle localization and tracking.

However, there are multiple problems associated to all procedures above: 1) calibrations often involves beads which are outside the sample whose optical properties themselves perturb wavefronts; 2) these methods do not rigorously propagate errors into the overall estimates; 3) the experimental solutions themselves are photon inefficient and result in a large amount of photon loss. For these reasons, it is advantageous to avoid approximations in theory and simultaneously avoid loss in optical equipment in an effort to both simultaneously correct for optical aberration and ultimately bring available tools toward quantitative 3D tracking in vivo.

2. Framework

Figure 1D:
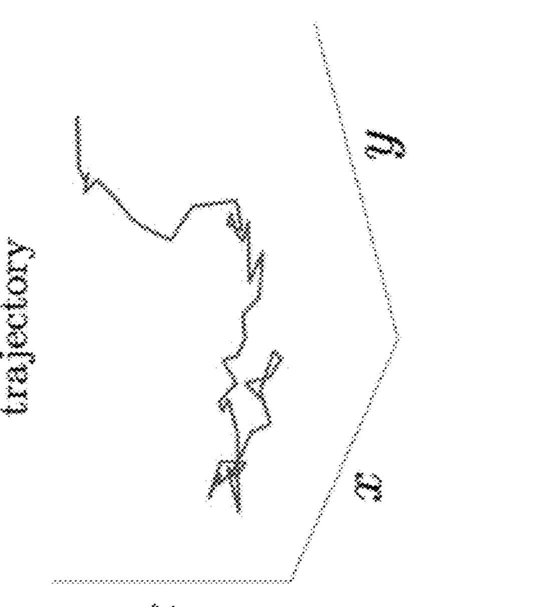
FIGS. 1B-1D are a series of graphical representations showing pupil phase, pupil amplitude, and particle trajectory obtained using the framework of FIG. 1A.
Figure 1C:
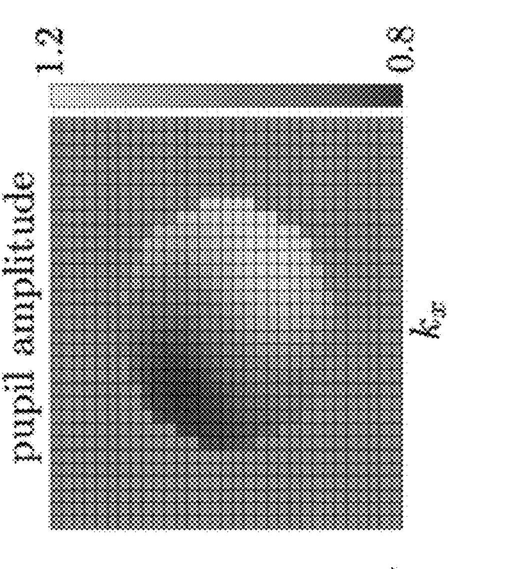
Figure 1C:
Figure 1B:
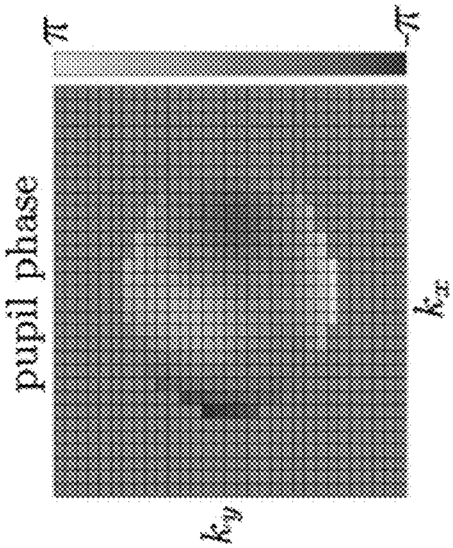

This section provides a brief description of the Bayesian framework implemented by the system. This section first introduces the likelihood of a single plane and then extends it to the case of multi-plane microscopes to break degeneracy in particle trajectory estimation due to the PSF's symmetry. FIG. 1A shows an illustration of a system 100 for localization and tracking of a dynamic particle observed using a bi-plane microscope. This bi-plane setup provides two slices of the PSF separated by Δz in the axial direction which in turn breaks the degeneracy in learning the particle's trajectory. The distortion in the wavefront can be due to the inhomogeneous optical properties of the specimen itself and/or refractive index mismatch. FIGS. 1B and 1C respectively show phase and amplitude of a pupil function corresponding with the example of FIG. 1A. FIG. 1D shows an example particle trajectory corresponding with the example of FIG. 1A.

In the far field limit, the PSF is related to the pupil function, $P(k_x, k_y)$, by scalar diffraction theory:

$$PSF(x, y; X_0^l, \mathcal{P}) \propto \left| \int\int_{Aperture} \mathcal{P}(k_x, k_y) \exp[i2\pi k_Z z_0^l] \exp[i2\pi(k_x(x - x_0^l) + k_y(y - y_0^l))] dk_x dk_y \right|^2 \quad (1)$$

where $k=(k_y, k_y, k_z)$, $$X = (x_0^l, y_0^l, z_0^l),$$

and (x, y), respectively, denote the wave vector, particle coordinates at the lth frame (time point), and the camera coordinates. Further, the pupil function is a complex quantity expressed by its phase and amplitude $\mathcal{P} = Ae^{i\Phi}$, and the axial component of the wave vector is given by $$k_z = \sqrt{k^2 - k_x^2 - k_y^2}.$$

The integral is performed over the range of wave vectors accessible through the aperture (objective) given by $$0 \leq \sqrt{k_x^2 + k_y^2} \leq \frac{N_a}{\lambda}$$

where $N_a$ and λ are, respectively, the numerical aperture and fluorescent light wavelength in vacuum. The above integral is typically computationally intense and can be approximated using sums that can be computed using fast Fourier transforms. Here, the dynamics of a single particle following a Brownian motion are assumed. As such, given the particle location at frame l, the location at frame l+1 follows:

$$X_0^{l+1} | X_0^l, D \sim \text{Normal}(X_0^l, 2D\Delta t) \quad (2)$$

where D and Δt, respectively, denote diffusion coefficient and frame exposure time.

Given the expected photon counts above, the likelihood of obtaining the observed photon count follows a Poisson distribution. As such, the likelihood of the entire sequence of frames is the independent product of the Poisson likelihood over every pixel.

The obtained likelihood can be used to learn the set of unknown parameters. In one aspect, the system can relate observation data to an associated likelihood of receiving the observation data with respect to a set of parameters, and can use this relationship to determine most likely values of the set of parameters.

Using the resulting PSF in Eq. 1, the expected number of photons reaching the nth pixel of the Ith frame is given by the following integral:

$$\Lambda_{nm}(X_o^l, \mathcal{P}, I_0, \mathcal{B}) = I_0 \int\int_{\mathcal{A}_{nm}} PSF(x, y; X_0^l, \mathcal{P}) dx dy + \mathcal{B} \quad (3)$$

where $I_0$, and $\mathcal{B}$ are, respectively, the total photon count from the emitter per frame and the background photons per pixel. Here, $\mathcal{A}_{nm}$ represents pixel area on the nth row and mth column of a 2D frame. The present disclosure shows $$\Lambda_{nm}(X_o^l, \mathcal{P}, I_0, \mathcal{B}) \text{ by } \Lambda_{nm}^l$$

hereafter for simplicity of the notation. Given the expected photon counts in Eq. 3, the likelihood of obtaining the observed photon count $w_{nm}$ for the pixel in the nth row and mth column follows a Poisson distribution. As such, the likelihood of obtaining observed photon counts of the entire sequence of frames is the independent product of the Poisson likelihood over every pixel:

$$P(\overline{W}|\overline{X}_0, \mathcal{P}, \mathcal{D}, I_0, B) = \prod_l \prod_n \prod_m \text{Poisson}(w^l_{nm}; \Lambda^l_{nm}). \tag{4}$$

where $\overline{W}$ and $\overline{X}_0$, respectively, denote the entire set of pixels in the sequence of frames, and the particle's trajectory across a given sequence of frames.

The obtained likelihood can be used to learn the set of unknown parameters. However, this likelihood is degenerate with respect to the particle trajectory due to the symmetry of the PSF below and above the focal plane. That is, this "likelihood" does not result in a unique particle trajectory. To overcome this issue, the system uses data acquired by a multi-plane optical system which samples the PSF at multiple z-locations with known separations. Therefore, the task of particle localization at a time point reduces to learning the particle's coordinates in one of the planes (reference plane) using data from all the planes which in turn breaks the symmetry and allows learning the true underlying trajectory.

As such, the above likelihood can be generalized to accommodate multi-plane (often bi-plane) imaging techniques that provides data from R slices of the PSF, designated by r=1, . . . , R. Therefore, the likelihood Eq. 4 modified is as follows:

$$P(\overline{W}|\vartheta) = \prod_r \prod_l \prod_n \prod_m \text{Poisson}(w^l_{nmr}; \Lambda^l_{nmr}). \tag{5}$$

The likelihood obtained in Eq. 5 above can now be employed as part of a measurement model to estimate the most likely values of the set of parameters including: the particle trajectory $\overline{X}_0$, pupil function $\mathcal{P}=Ae^{i\Phi}$, diffusion coefficient D, particle photon emission rate (photon counts per frame $I_0$), and the background photon count per pixel $\mathcal{B}$. These parameters are collectively regrouped under $\vartheta=(\overline{X}_0, \mathcal{P}, D, I_0, \mathcal{B})$. The likelihood is multiplied by priors on the unknown parameters to construct a posterior:

$$P(\vartheta|\overline{W}) \propto P(\overline{W}|\vartheta)P(\vartheta) \tag{6}$$

where $P(\vartheta)$ stands for priors on these parameters. Here, the most notable prior is the Gaussian prior (GP) on the phase of the pupil function:

$$\Phi \sim GP(0, K) \tag{7}$$

and similarly for the amplitude a GP prior is also used; see section 6 of the present disclosure. Furthermore, the prior on the particle's trajectory is given by Eq. 2. For the rest of the parameters, priors are selected based on either computational or physical motivation.

Figure 2:
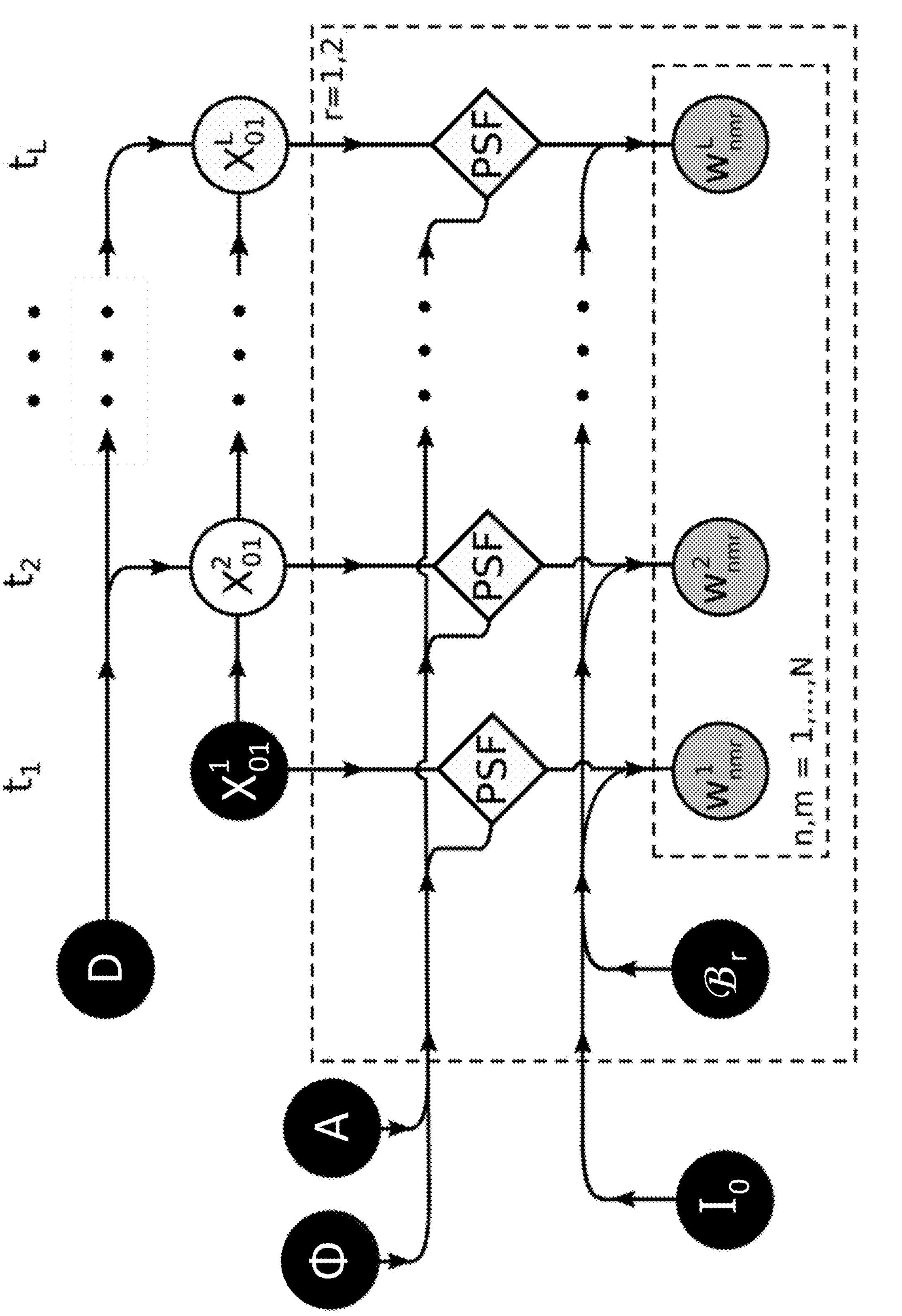
FIG. 2 is an illustration showing a graphical model of parameter dependencies of a measurement model outlined herein across a plurality of timesteps.

With the posterior at hand, parameters can now be inferred. However, the resulting posterior cannot be directly sampled on account of its complicated form. Therefore, the system applies a Markov chain Monte Carlo procedure to iteratively sweep over the set of parameters and determine respective likelihoods associated with receiving the observation data. FIG. 2 shows a graphical model for sampling parameter values using the Markov chain Monte Carlo procedure. In FIG. 2, A represents magnitude/amplitude of the pupil function, $\Phi$ represents phase of the pupil function, and $$w^r_{nml}$$

represents data frame images. Further, $I_0$ represents photon emission rate, $\mathcal{B}_r$ represents background emission rate at the r-plane, $$X^l_{01}$$

represents particle location at time l, and D represents the diffusion constant. l=0, . . . , L counts data acquisition times, r represents the imaging plane, n represents pixel row index and m represents pixel column index. The black circles represent parameters to be learned. Gray circles represent data. White circles represent hidden parameters, Diamond shapes represent variables that can be deterministically calculated from other parameters.

In each iteration, parameters are sampled in the following order: 1) sample likelihoods respectively associated with phase and amplitude of the pupil function by drawing values from the phase and amplitude posteriors using the Metropolis-Hasting (MH) procedure; 2) sample likelihoods associated with a trajectory of a particle over a plurality of frames by proposing new trajectories, (i.e., sets of particle locations across all the frames within a given sequence) and sampling respective likelihoods of obtaining the proposed trajectories, using the hit-and-run sampler. That is, at each iteration, the system proposes a new trajectory by displacing a possible location of the particle from a previous location along random directions for each time point (i.e., for each frame); 3) sample likelihoods associated with a diffusion coefficient by directly sampling from the posterior; 4) sample likelihoods associated with photon counts from the particle per frame using a Metropolis-Hastings (MH) procedure; 5) sample likelihoods associated with a background photon count per pixel per frame again using the MH procedure.

At the end, the set of samples drawn can be employed for further numerical analysis. The system can use the sampled likelihoods to infer most likely values of the set of parameters are observable based on the actual observed data and based on the various probabilities associated with observing the observed data given the parameter values that were sampled.

Section 3 outlines a computer-implemented system and method for particle localization and tracking based on the above. Sections 4-6 of the present disclosure provide further information about the measurement model including selections for priors for each respective parameter. Section 7 of the present disclosure shows experimental results from one example implementation of the systems and methods outlined herein.

3. Computer-Implemented System

3.1 Computing Device

Figure 3:
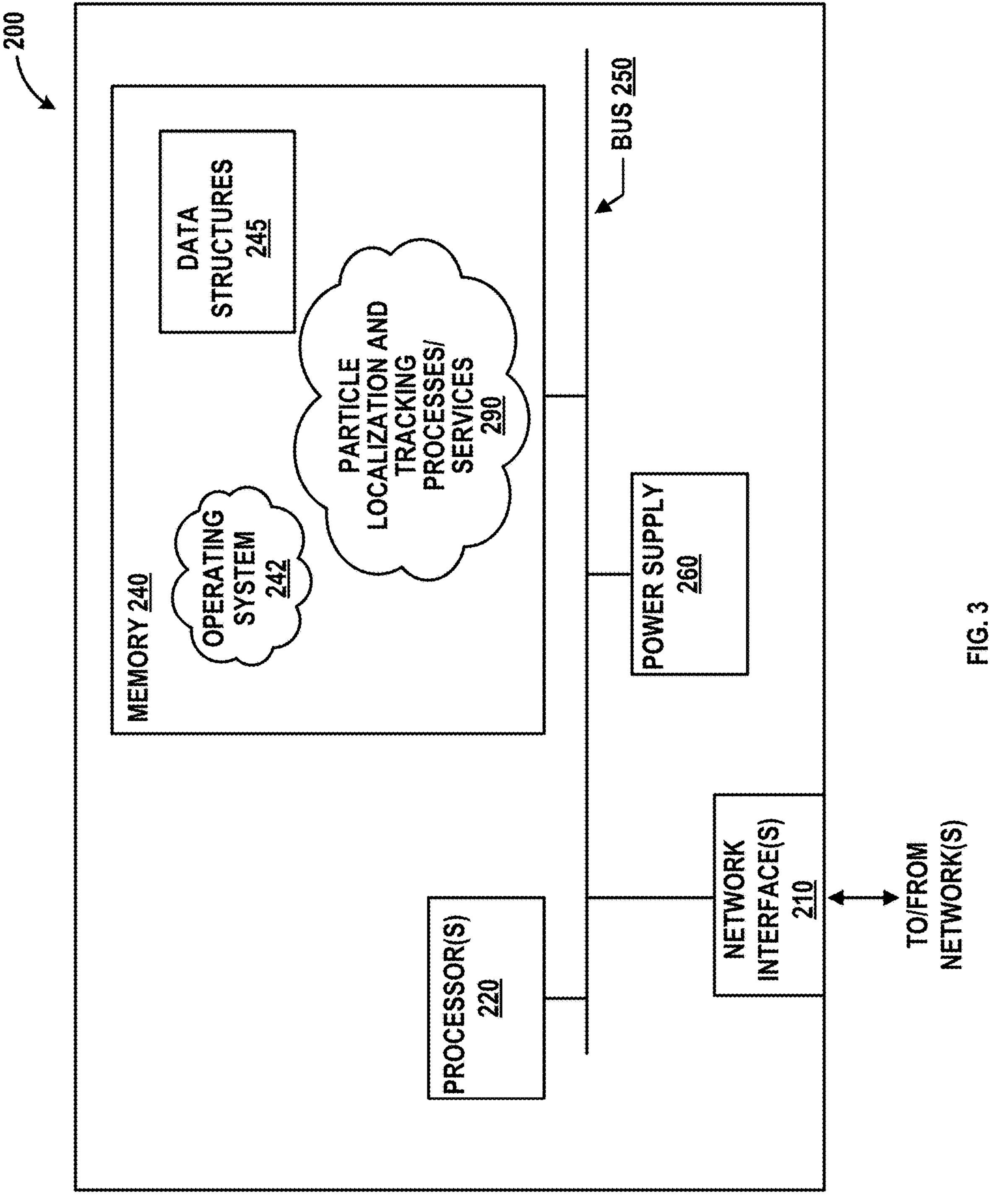
FIG. 3 is a simplified diagram showing an exemplary computing device for implementation of a computer-implemented particle localization and tracking framework outlined herein that includes the measurement model of FIG. 2.

FIG. 3 is a schematic block diagram of an example device 200 that may be used with one or more embodiments described herein, e.g., as a component of the system and implementing aspects of the methods outlined above.

Device 200 comprises one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over the communication links coupled to a communication network. Network interfaces 210 are configured to transmit and/or receive data using a variety of different communication protocols. As illustrated, the box representing network interfaces 210 is shown for simplicity, and it is appreciated that such interfaces may represent different types of network connections such as wireless and wired (physical) connections. Network interfaces 210 are shown separately from power supply 260, however it is appreciated that the interfaces that support PLC protocols may communicate through power supply 260 and/or may be an integral component coupled to power supply 260.

Memory 240 includes a plurality of storage locations that are addressable by processor 220 and network interfaces 210 for storing software programs and data structures associated with the embodiments described herein. In some embodiments, device 200 may have limited memory or no memory (e.g., no memory for storage other than for programs/processes operating on the device and associated caches). Memory 240 can include instructions executable by the processor 120 that, when executed by the processor 220, cause the processor 220 to implement aspects of the system and the methods outlined herein.

Processor 220 comprises hardware elements or logic adapted to execute the software programs (e.g., instructions) and manipulate data structures 245. An operating system 242, portions of which are typically resident in memory 240 and executed by the processor, functionally organizes device 200 by, inter alia, invoking operations in support of software processes and/or services executing on the device. These software processes and/or services may include particle localization and tracking processes/services 290, which can include aspects of methods and/or implementations of various modules described herein. Note that while particle localization and tracking processes/services 290 is illustrated in centralized memory 240, alternative embodiments provide for the process to be operated within the network interfaces 210, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the particle localization and tracking processes/services 290 is shown as a standalone process, those skilled in the art will appreciate that this process may be executed as a routine or module within other processes.

3.2 Method

Figure 4A:
FIGS. 4A and 4B are a pair of process flow diagrams illustrating a method for particle localization and tracking under the measurement model of FIG. 2 that may be implemented using the computing device of FIG. 3.
Figure 4B:
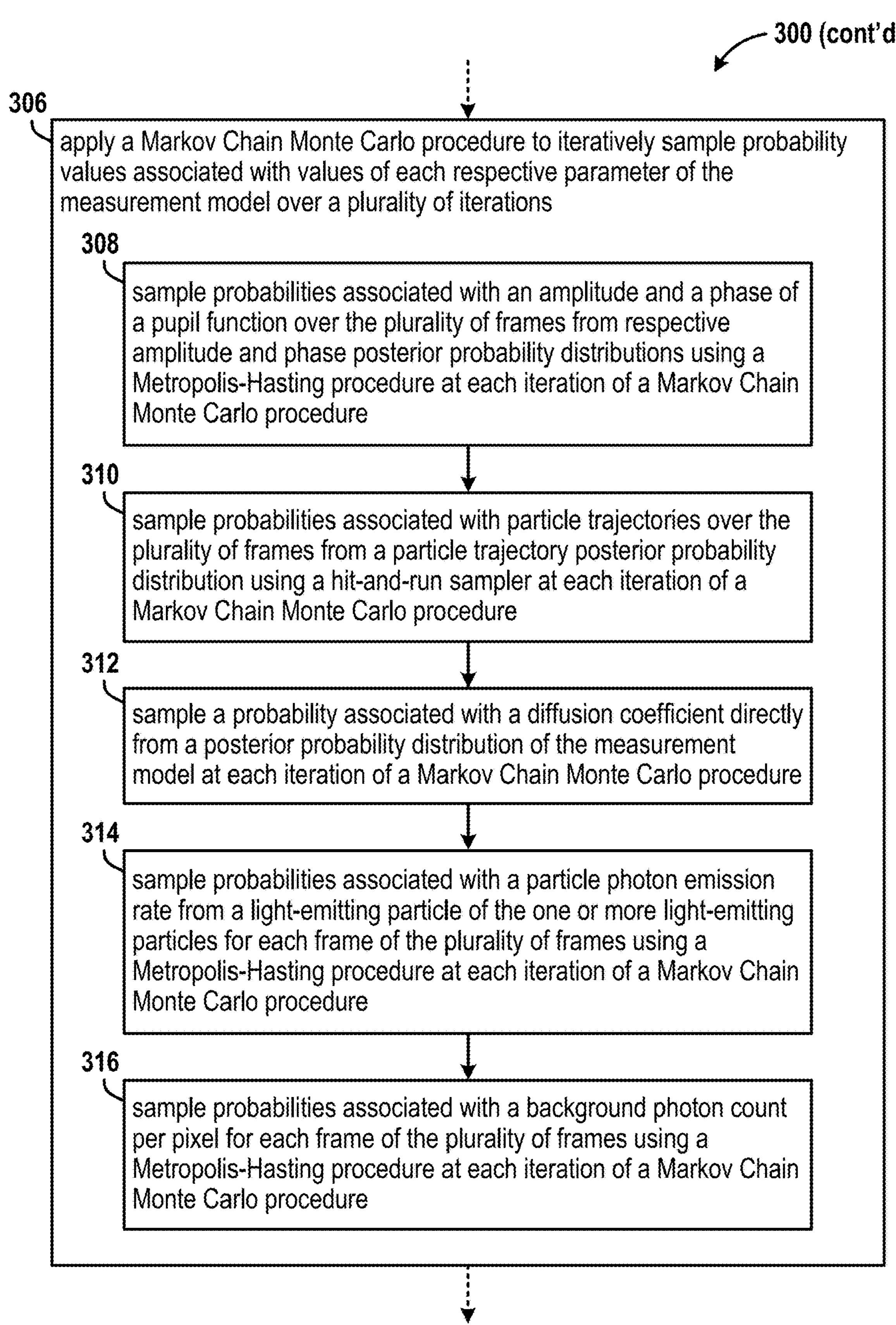

A method 300 outlined herein and shown in FIGS. 4A and 4B for particle localization and tracking may be implemented using device 200 (e.g., as part of particle localization and tracking processes/services 290) in accordance with the system 100 shown in FIG. 1A. The method 300 corresponds with FIGS. 1A and 2 and their corresponding discussion, as well as the Inverse Model presented in section 6 of the present disclosure.

Referring to FIG. 4A, step 302 of method 300 includes accessing observation data including brightness data indicative of one or more light-emitting particles captured across a plurality of frames and across a plurality of planes by an imaging device, the plurality of frames having an aberration profile observable across each frame of the plurality of frames. In some examples outlined herein, observation data is denoted as observed photon counts $\overline{w}$ across a set of pixels for the plurality of frames.

Step 304 of method 300 includes sampling a set of joint probability values associated with observing the observation data for values of each respective parameter of a plurality of parameters of a measurement model, the plurality of parameters including: a particle trajectory for each respective light-emitting particle of the one or more light-emitting particles across the plurality of frames; and a set of point spread function parameters of a point spread function of the imaging device. The set of point spread function parameters can include an amplitude and a phase of a pupil function associated with the aberration profile and the point spread function of the imaging device. Other parameters of the plurality of parameters that are jointly sampled within step 304 include a diffusion coefficient, a photon emission rate, and a background photon count per pixel. In other words, step 304 aims to address "what is the likelihood of observing the observation data given a set of parameter values". In some examples outlined herein, the plurality of parameters of the measurement model are denoted as $\vartheta=(\overline{X}_0, \mathcal{P}, D, I_0, \mathcal{B})$. Further, note that the measurement model simultaneously considers each frame of the plurality of frames.

Because the posterior probability distributions associated with the parameters mentioned in step 304 are intractable and computationally expensive, step 304 may be performed using step 306 of method 300. Step 306 includes applying a Markov Chain Monte Carlo procedure to iteratively sample probability values associated with values of each respective parameter of the measurement model over a plurality of iterations.

Step 306, which is a sub-step of step 304, can include various sub-steps including steps 308-316 that are iteratively performed as part of the Markov Chain Monte Carlo procedure, outlined in FIG. 4B. Within an iteration, steps 308-316 may be performed sequentially, and may be repeated until convergence of the Markov Chain Monte Carlo procedure.

Step 308 includes sampling probabilities of the set of joint probability values associated with an amplitude and a phase of a pupil function over the plurality of frames from respective amplitude and phase posterior probability distributions of the measurement model. Step 308 may be applied using a Metropolis-Hasting procedure at each iteration of the Markov Chain Monte Carlo procedure of step 306. In some examples outlined herein, the pupil function can be denoted as $P=Ae^{i\Phi}$, where A denotes an amplitude of the pupil function and $\Phi$ denotes a phase of the pupil function. The amplitude and phase posterior probability distributions can be respectively obtained through application of Gaussian priors on the amplitude and phase of the pupil function.

Step 310 includes sampling probabilities associated with particle trajectories over the plurality of frames from a particle trajectory posterior probability distribution of the measurement model. Step 310 may be applied using a hit-and-run sampler at each iteration of the Markov Chain Monte Carlo procedure of step 306. In some examples outlined herein, the particle trajectories are denoted as $\overline{X}_0$.

Step 312 includes sampling a probability associated with a diffusion coefficient directly from a posterior probability distribution of the measurement model for the diffusion coefficient at each iteration of the Markov Chain Monte Carlo procedure of step 306. In some examples outlined herein, the diffusion coefficient is denoted as D.

Step 314 includes sampling probabilities associated with a particle photon emission rate from a light-emitting particle of the one or more light-emitting particles for each frame of the plurality of frames from a posterior probability distribution of the measurement model for the particle photon emission rate. Step 314 may be applied using a Metropolis-Hasting procedure at each iteration of the Markov Chain Monte Carlo procedure of step 306. In some examples outlined herein, the particle photon emission rate is denoted with $I_0$.

Step 316 includes sampling probabilities associated with a background photon count per pixel for each frame of the plurality of frames from a posterior probability distribution of the measurement model. Step 316 may be applied using a Metropolis-Hasting procedure at each iteration of the Markov Chain Monte Carlo procedure of step 306. In some examples outlined herein, the background photon count per pixel is denoted as $\mathcal{B}$.

Referring back to FIG. 4A, following step 304, including convergence of the Markov Chain Monte Carlo procedure of step 306, step 318 of method 300 includes jointly inferring, based on the set of joint probability values and the observation data, a set of most probable values of the plurality of parameters.

4. Fourier Optics and PSF Engineering

Figure 5:
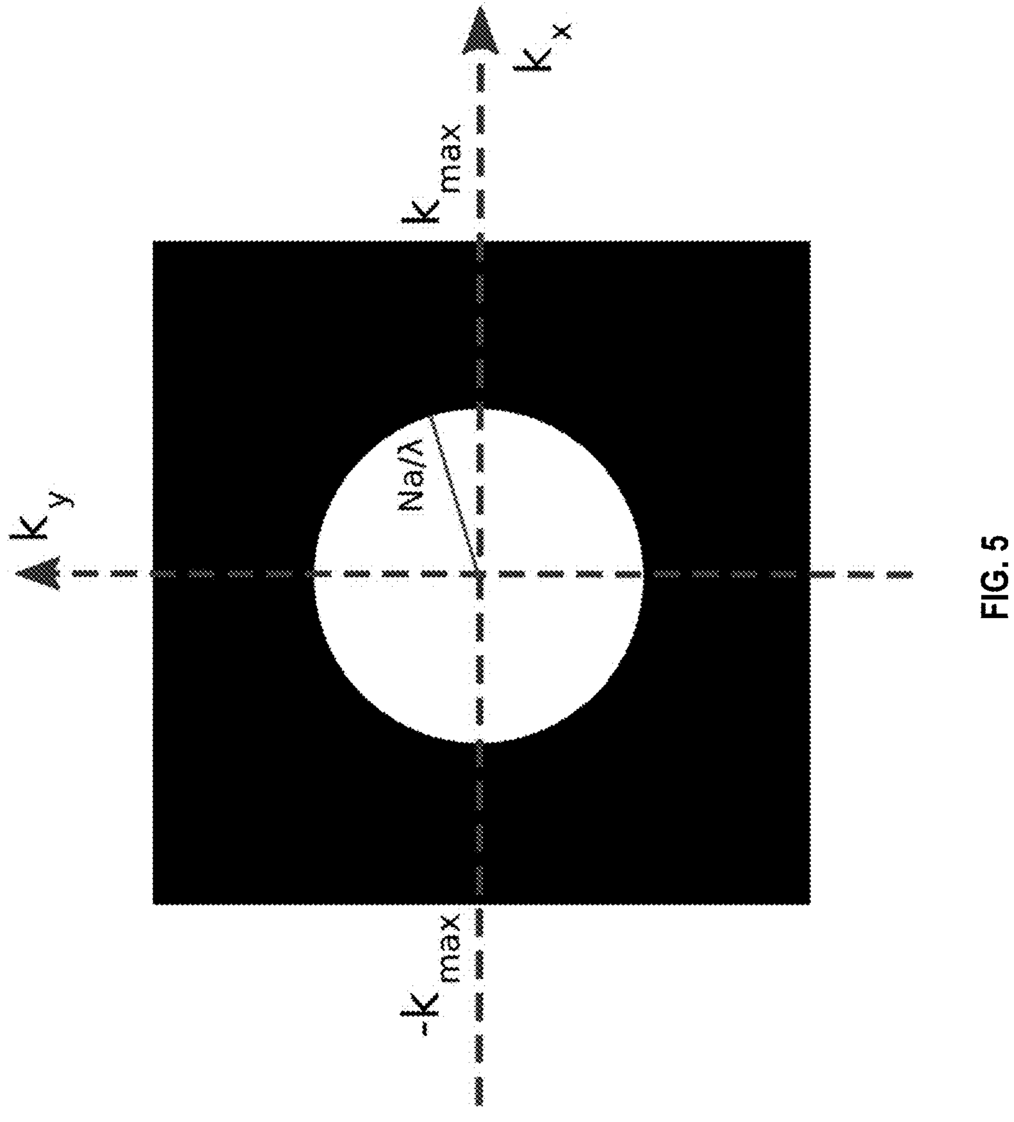
FIG. 5 is an illustration showing a frequency-domain mask for implementation of the method of FIGS. 4A and 4B.

A plane wave (single frequency) is described by:

$$U(x,\ y,\ z) = \exp[i2\pi(k_x x + k_y y + k_z z)] \tag{8}$$

where $k_x$, $k_y$ and $k_z$ are components of the vector $\vec{k}$ and $$k_x^2 + k_y^2 + k_z^2 = \frac{n^2}{\lambda^2} n$$

and $\lambda$ are respectively, the refractive index of the medium and the wavelength of light in vacuum. At z=0 plane, the plane wave is given by $U(x, y, 0)=\exp[i2\pi(k_x x+k_y y)]$. Traveling along the z-axis, at $z=z_0$ plane, the plane wave is then $U(x, y, z_0)=\exp[i2\pi(k_x x+k_y y+k_z z_0)]$. This can be expressed as follows:

$$U(x,\ y,\ z_0) = U(x,\ y,\ 0)\exp[i2\pi k_z z_0] \tag{9}$$

where $\exp[i2\pi k_z z_0]$ is single frequency plane wave propagator $$H(k_x, k_y) = \exp\left[i2\pi z_0 \sqrt{k^2 - k_x^2 - k_y^2}\right] \tag{10}$$

which is also called the defocus. An arbitrary field at z=0 can be written as a superposition of single-frequency plane waves:

$$f(x, y) = \int\int_{-\infty}^{\infty} F(k_x, k_y)\exp[i2\pi(k_x x + k_y y)]dk_x dk_y \tag{11}$$

where $F(k_x, k_y)$ is the Fourier transform of f(x, y). The transmitted wave $f(x, y, z_0)$ is then:

$$f(x, y, z_0) = \int\int_{-\infty}^{\infty} F(k_x, k_y)\exp\left[i2\pi z_0 \sqrt{k^2 - k_x^2 - k_y^2}\right]\exp[i2\pi(k_x x + k_y y)]dk_x dk_y \tag{12}$$

which is the Fourier transform of the product of $F(k_x, k_y)$ and the defocus term. Note that $f(x, y, z_0)$ describes the field at location x, y when the source (emitter) is located at $x_o=0$, $y_0=0$ and $z_0$. (The above equation is the scalar approximation for diffraction valid in the far-field limit.) In the case of microscopes, the Fourier transform of the light's electric field is termed the pupil function $\mathcal{P}(k_x, k_y)$ which describes the wavefront and its distortions due to optical aberrations and/or extra phase intentionally added for point spread function (PSF) engineering. Here, similar to eq. 12:

$$E(x, y, X_0) = \int\int_{Aperture} P(k_x, k_y)\exp\left[i2\pi z_0 \sqrt{k^2 - k_\chi^2 - k_y^2}\right]\exp[i2\pi(k_x x + k_y y)]dk_x dk_y \tag{13}$$

where limits of the integral are also from zero up to the maximum spatial frequency transmitted by the objective/aperture, $$\sqrt{k_x^2 + k_y^2} = \frac{N_a}{\lambda},$$

where $N_a=n \sin \theta$ is the numerical aperture of the microscope. Here, x and y are the camera coordinates, and the particle is located at $$X_0^l = (x_0^l, y_0^l, z_0^l)$$

in the lth frame. For convenience, with reference to FIG. 5, a mask, $M(k_x, k_y)$, can be defined in the frequency domain where:

$$M(k_x, k_y) = \begin{cases} 1 & k_x^2 + k_y^2 < \frac{N_a^2}{\lambda^2} \\ 0 & k_x^2 + k_y^2 > \frac{N_a^2}{\lambda^2} \end{cases} \tag{14}$$

assuming a limited size for the mask so that $-k_{max} \le k_x, k_y \le k_{max}$. Using the mask (14), the integral (13) can be written as:

$$E(x, y, X_0^l) = \int_{-k_{max}}^{k_{max}} \int_{-k_{max}}^{k_{max}} M(k_x, k_y) P(k_x, k_y) \exp\left[i2\pi z_0 \sqrt{k^2 - k_x^2 - k_y^2}\right] \exp\left[i2\pi\left(k_x(x - x_0^l) + k_y(y - y_0^l)\right)\right] dk_x dk_y \quad (15)$$

where the limits of the integral now coincide with the limits of the mask.

The PSF is then the intensity of diffracted light, given by:

$$PSF(x, y; A, \Phi, X_0^l) = \left| \int_{-k_{max}}^{k_{max}} \int_{-k_{max}}^{k_{max}} M(k_x, k_y) A(k_x, k_y) \exp[i\Phi(k_x, k_y)] \times \exp\left[i2\pi z_0^l \sqrt{k^2 - k_x^2 - k_y^2}\right] \exp\left[i2\pi\left(k_x(x - x_0^l) + k_y(y - y_0^l)\right)\right] dk_x dk_y \right|^2 \quad (16)$$

where $\mathcal{P}(k_x, k_y) = A(k_x, k_y)\exp[i\Phi(k_x, k_y)]$ and $A(k_x, k_y)$ and $\Phi(k_x, k_y)$ are, respectively, magnitude and phase of the pupil function and are real quantities. Using the above PSF, the expected photon counts over a pixel is given by:

$$\Lambda_{nm}(A, \Phi, X_0^l, I_0, B) = B + I_0 \int\int_{A_{pixel}} PSF(x, y; A, \Phi, X_0^l) dx dy \quad (17)$$

where $\mathcal{B}$, $I_0$, and $\mathcal{A}_{pixel}$ are, respectively, the background photon count per pixel, total photon count from the particle, and the pixel area.

The present disclosure has so far discussed an imaging model using continuous coordinates, however, calculation of integrals in eqs. 16 and 17 are often computationally expensive. As such, it is convenient to approximate these integrals by sums. To do so, note that the PSD is usually measured over a region of interest (ROI) with N×N pixels with pixel size of a, where n, m=1, . . . , N, respectively, count rows and columns of pixels in that ROI. The Fourier transform of the PSF is therefore also given over a region of N×N pixels (i.e., a grid) with a pixel size (i.e., grid step size) of 1/(aN) in the frequency domain, where the discrete frequencies along x and y axes are given by $$k_\mu, k_\nu = -\frac{1}{2a}, -\frac{1}{2a} + \frac{1}{aN}, \ldots, \frac{1}{2a} - \frac{1}{aN}, \frac{1}{2a}.$$

The integral in (16) can thus be written as a sum:

$$PSF_{nm}(A, \Phi, X_0^l) = \alpha_{PSF} \left| \sum_{\mu=1}^{N} \sum_{\nu=1}^{N} M_{\mu\nu} A_{\mu\nu} \exp[i\Phi_{\mu\nu}] \exp\left[i2\pi z_0^l \sqrt{k^2 - k_\mu^2 - k_\nu^2}\right] \exp\left[i2\pi\left(k_\mu(n - x_0^l) + k_\nu(m - y_0^l)\right)\right] \right|^2 \quad (18)$$

which can be calculated using the fast Fourier transform (FFT) with a low computational cost. Note that $$k_{max} = \frac{1}{2a}, \alpha_{PSF}$$

is the normalization constant and μ, ν count pixels (samples) in the Fourier domain. Therefore:

$$PSF_{nm}(A, \Phi, X_0^l) = \alpha_{PSF} \left| FFT\left\{ MA_{exp}\left[ I\Phi + i2\pi z_0^l \sqrt{k^2 - k_x^2 - k_y^2} - i2\pi\left(k_x x_0^l + k_y y_0^l\right)\right]\right\}\right|^2. \quad (19)$$

where M, A, and Φ represent the entire sets of $\{M_{\mu\nu}, A_{\mu\nu}, \Phi_{\mu\nu}\}$.

The above equation yields the PSF values at the pixel centers which can be multiplied by the pixel area to approximate the PSF integral required in calculating the expected photon counts over pixels, see eq. 17. However, particle localization based on such approximation would not provide sufficient precision and accuracy for super-resolved tracking. To remedy this issue, it is necessary to calculate pixel values with resolutions below the data pixel size and sum over the obtained values to gain a more accurate approximation of the integral in eq. 17. To calculate PSFs below the pixel size, it is common to use zero-padding in Fourier domain, which essentially means increasing the sizes of M, A, and Φ in eq. 19 to larger frequencies by adding zeroes to them. Although the zero-padding method does not yield any additional information, it gives PSF values below the pixel size via interpolation.

Assuming that zero-padding results in J samples of PSF per pixel, the result is shown by $$PSF_{nmj}(A, \Phi, X_0^l).$$

Therefore, the expected photon count at the nth and mth pixel is given by:

$$\Lambda_{nm}(A, \Phi, X_0^l, I_0, B) = B + I_0 \frac{A_{pixel}}{J} \sum_j PSF_{nmj}(A, \Phi, X_0^l), \quad (20)$$

where $$\frac{A_{pixel}}{J}$$

is the area of the pixel divided into J sub-pixels. Now, a likelihood can be constructed that employs the obtained expected photon counts which can be used to track the particle across L frames. However, due to the symmetry of the PSF with respect to the focal plane, the localization accuracy along the axial direction would be insufficient. One way to address this issue is multi-plane imaging resulting in multiple simultaneous slices of the PSF along the axial direction with known separation. The expected photon counts for each plane can be computed similar to eq. 20:

$$\Lambda_{nm}^l(A, \Phi, X_{0_r}^l, I_0, B) = B_r + I_0 \frac{A_{pixel}}{J} \sum_j PSF_{nmj}(A, \Phi, X_{0_r}^l), \quad (21)$$

where r counts R planes in the imaging setup. Therefore, assuming only shot noise, the total likelihood is:

$$P(\bar{W} \mid \vartheta) \prod_r \prod_l \prod_n \prod_m \frac{e^{-\Lambda_{nmr}^l} {\Lambda_{nmr}^l}^{w_{nmr}^l}}{w_{nmr}^l!} \tag{22}$$

where $$W_r^l$$

and $\bar{W}$ are, respectively, the measured photon counts over the lth frame and the rth plane and the entire set of pixels across all frames and all planes. Moreover, here $\vartheta=\{A, \Phi, \overline{X_0}, I_0, \mathcal{B}_{1:R}\}$ shows the entire set of unknowns.

$$\Lambda_{nmr}(A, \Phi, X_{0r}^l, I_0, \mathcal{B}_r).$$

Here a note is warranted on the multi-plane setup. In such setups, the axial locations are often registered to be the same across all the planes and the interplane distance along the axial direction (z) is known. As such, one of the planes is assumed to be the reference plane and the particle location is learned in that plane. The particle location in the remaining planes are deterministically related to the location in the reference frame using translation and rotation which can be simultaneously performed using affine transformations. Here, assume that the reference plane is r=1 and only calculate particle location in this plane, namely $$X_{0r}^l.$$

5. Freely Diffusing Emitter

Up to this point, the discussion has assumed an emitter with a fixed location. Now, the present disclosure considers a dynamic dye that freely diffuses and explore the area and therefore its locations changes over time as follows:

$$x_{01}(t_0) \sim \text{Normal}(\mu_{x0}, 2D\Delta t_l) \tag{23}$$

$$y_{01}(t_0) \sim \text{Normal}(\mu_{y0}, 2D\Delta t_l) \tag{24}$$

$$z_{01}(t_0) \sim \text{Normal}(\mu_{z0}, 2D\Delta t_l) \tag{25}$$

$$x_{01}(t_l) \sim \text{Normal}(x_{01}(t_{l-1}), 2D\Delta t_l) \tag{26}$$

$$y_{01}(t_l) \sim \text{Normal}(y_{01}(t_{l-1}), 2D\Delta t_l) \tag{27}$$

$$z_{01}(t_l) \sim \text{Normal}(z_{01}(t_{l-1}), 2D\Delta t_l) \tag{28}$$

where l counts frames and $\Delta t_l=t_l-t_{l-1}$ is the exposure time for the lth frame, and D is the diffusion coefficient. $x_{01}(t_0)$, $y_{01}(t_0)$ and $z_{01}(t_0)$ are the particle's initial location in the reference plane assumed to be at a random position across the ROI taken from normal distributions in (23-25). As mentioned before, the particle's position in the second plane is deterministically related to the first (reference) plane by an affine transformation. Finally, using the generated sequence of particle locations, the expected photon counts $$\Lambda_{nmr}^l$$

can be computed using eq. 21 and can then be used in turn to find the likelihood in eq. 22.

6. Inverse Model

With reference to FIG. 2. this section first gives a summary of the inverse model including priors used on knowns and the likelihood model, and then provides further details.

$$\log(A) \sim GP(0, K_A) \tag{29}$$

$$\Phi \sim GP(0, K_\Phi) \tag{30}$$

$$D \sim InvGamma(\alpha_D, \beta_D) \tag{31}$$

$$I_0 \sim \text{Gamma}(\alpha_1, \beta_1) \tag{32}$$

$$B^r \sim \text{Gamma}(\alpha_B, \beta_B) \tag{33}$$

$$x_{01}^1 \mid D \sim \text{Normal}(\mu_x, \sigma_{xy}^2) \tag{34}$$

$$y_{01}^1 \mid D \sim \text{Normal}(\mu_y, \sigma_{xy}^2) \tag{35}$$

$$z_{01}^1 \mid D \sim \text{Normal}(\mu_z, \sigma_z^2) \tag{36}$$

$$x_{01}^l \mid x_{01}^{l-1}, D \sim \text{Normal}(x_{01}^{l-1}, 2D\Delta t) \tag{37}$$

$$y_{01}^l \mid y_{01}^{l-1}, D \sim \text{Normal}(y_{01}^{l-1}, 2D\Delta t) \tag{38}$$

$$z_{01}^l \mid z_{01}^{l-1}, D \sim \text{Normal}(z_{01}^{l-1}, 2D\Delta t) \tag{39}$$

$$w_{nmr}^l \mid A, \Phi, D, l_0, B^r, X_{0r}^l \sim Poisson(\Lambda_{nmr}^l) \tag{40}$$

$$\Lambda_{nmr}^l = \int \left( B^r + I_0 \frac{A_{pixel}}{J} \sum_j PSF_{nmj}(A, \Phi, X_{0_r}^l) \right) dt = \left( B^r + I_0 \frac{A_{pixel}}{J} \sum_j PSF_{nmj}(A, \Phi, X_{0_r}^l) \right) \Delta t \tag{41}$$

where $K_\Phi$ and $K_A$ are the covariance kernels for Gaussian process (GP) priors given by:

$$K_\Phi(\vec{k}, \vec{k}') = \sigma_A^2 \exp\left[ -\frac{1}{2} \left( \frac{\vec{k} - \vec{k}'}{L_\Phi} \right)^2 \right] \tag{42}$$

$$K_A(\vec{k}, \vec{k}') = \sigma_A^2 \exp\left[ -\frac{1}{2} \left( \frac{\vec{k} - \vec{k}'}{L_A} \right)^2 \right] \tag{43}$$

where $\vec{k}=(k_x, k_y)$ are the coordinates in the Fourier domain and $\sigma_\Phi$, $\sigma_A$, $L_\Phi$ and $L_A$ are positive quantities. It is assumed that the PSF is already integrated over space.

6.1 Making Inference About Φ

The target distribution of the phase of the pupil function, Φ, is given by:

$$\Phi \sim P(\Phi \mid A, D, I_0, \overline{X_0}, \overline{W}, B_{1:R}) \propto P(\overline{W} \mid A, \Phi, h, \overline{X}, B_{1:R})P(\Phi) = \left[\prod_n \prod_m \prod_l \prod_r \frac{\exp[-\Lambda_{nmr}^l](\Lambda_{nmr}^l)^{w_{nmr}^l}}{w_{nmr}^l}\right] GP(\Phi; 0, K_\Phi) \tag{44}$$

Gaussian processes technique is used to sample the phase of the pupil function (A). To do so, the amplitude is sampled at a mesh grid of test points with the same number of elements as the data ROIs. Since the likelihood is not conjugate to the GP prior, Metropolis-Hastings (MH) technique can be employed to sample the posterior (44):

$$A = \frac{P(\Phi^{j+1} \mid A, D, I_0, \overline{X_0}, \overline{W}, B_{1:R})}{P(\Phi^j \mid A, D, I_0, \overline{X_0}, \overline{W}, B_{1:R})} \frac{Q(\Phi^j \mid \Phi^{j+1})}{Q(\Phi^{j+1} \mid \Phi^j)} \tag{45}$$

where Q is the proposal distribution and j count samples. The GP prior itself can be used as the sampling distribution and therefore the acceptance ratio is given by the likelihood ratios:

$$\mathbb{A} = \prod_n \prod_m \prod_l \prod_r \left[\exp\left[-\left(\Lambda_{nmr}^{l\phi j+1} - \Lambda_{nmr}^{l\phi j}\right)\right]\left(\frac{\Lambda_{nmr}^{l\phi j+1}}{\Lambda_{nmr}^{l\phi j}}\right)^{w_{nmr}^l}\right] \tag{46}$$

where $$\Lambda_{nmr}^{l\phi j+1}$$

is calculated using the proposed phase $\Phi^{j+1}$.

6.2 Making Inference About A

The target distribution of the amplitude of the pupil function, A, is given by:

$$A \sim P(A \mid \Phi, D, I_0, \overline{X_0}, \overline{W}, B_{1:R}) \propto P(\overline{W} \mid A, \Phi, D, I_0, \overline{X_0}, \overline{W}, B_{1:R})P(A) = \left[\prod_n \prod_m \prod_l \prod_r \frac{\exp[-\Lambda_{nmr}^l](\Lambda_{nmr}^l)^{w_{nmr}^l}}{w_{nmr}^l!}\right] GP(A; 0, K_A) \tag{47}$$

Gaussian process technique can be used to sample the amplitude of the pupil function. However, while the amplitude is a positive quantity, GPs allow negative values as well. Thus, a substitution $A=e^{\chi}$ can be made and $\chi$ can be learned, which can be either negative or positive. Similar to Φ, MH technique can be employed to sample the posterior (47) and the Gaussian process prior can be used as proposal distribution. Therefore the acceptance ratio is given by:

$$\mathbb{A} = \prod_n \prod_m \prod_l \prod_r \left[\exp\left[-\left(\Lambda_{nmr}^{lAj+1} - \Lambda_{nmr}^{lAj}\right)\right]\left(\frac{\Lambda_{nmr}^{lAj+1}}{\Lambda_{nmr}^{lAj}}\right)^{w_{nmr}^l}\right] \tag{48}$$

where $$\Lambda_{nmr}^{lAj+1}$$

is calculated using the proposed amplitude.

6.3 Making Inference About D

The target distribution of the diffusion constant, D, is given by $$D \sim P(D \mid \Phi, A, D, I_0, \overline{X}, \overline{W}, B_{1:R}) \propto P(D \mid \overline{X})P(D) = \left[\prod_r \text{Normal}(X_r^1; \vec{\mu}, \sigma_\mu^2) \prod_{l=2} [\text{Normal}(X_r^{l-l}; X_r^l, 2D\Delta t)]\right] InvGamma(D; \alpha_D, \beta_D) \tag{49}$$

The InvGamma prior is conjugate to the likelihood and the target posterior has a closed form given by $$P(D \mid \Phi, A, D, I_0, \overline{X}, \overline{W}, B_{1:R}) \tag{50}$$

$$\propto \prod_{l=2} [\text{Normal}(X_\gamma^{l-1}; X_\gamma^l, 2D\Delta t) InvGamma(D; \alpha_D, \beta_D)] \tag{51}$$

$$\propto \frac{1}{D^{\frac{3}{2}RL+\alpha_D}} \exp\left[-\frac{\frac{1}{4\Delta t}\left(\sum_{l=2}^L (X_1^l - X_1^{l-1})^2 + \sum_{l=2}^L (X_2^l - X_2^{l-1})^2\right)}{D}\right] \tag{52}$$

$$= \frac{1}{D^{\alpha'_D}} \exp\left[-\frac{\beta'_D}{D}\right] \propto InvGamma(D; \alpha'_D, \beta'_D) \tag{53}$$

where the terms that are not dependent on D are dropped in the last step. Furthermore:

$$\alpha'_D = \frac{3}{2}R(L-1) + \alpha_D \tag{53}$$

$$\beta'_D = \frac{1}{4\Delta t}\left(\sum_{l=2}^L (X_1^l - X_1^{l-1})^2 + \sum_{l=2}^L (X_2^l - X_2^{l-1})^2\right) + \beta_D \tag{54}$$

where R is the number of planes. Therefore, the diffusion constant, D, can be directly sampled from the posterior (53).

6.4 Making Inference About $I_0$

The target distribution of $I_0$ is given by:

$$I_0 \sim P(I_0 \mid \Phi, A, D, \overline{X_0}, \overline{W}, B_{1:R}) \propto P(\overline{W} \mid \Phi, A, D, \overline{X_0}, \overline{W}, B_{1:R})P(I_0) = \left[\prod_r \prod_n \prod_m \prod_l \frac{\exp[-\Lambda_{nmr}^l](\Lambda_{nmr}^l)^{w_{nmr}^l}}{w_{nmr}^l!}\right] \text{Gamma}(I_0; \alpha_I, \beta_I) \tag{56}$$

Since the posterior (56) does not have a closed form, MH technique can be employed to draw samples:

$$A = \frac{P(I_0^{j+1} \mid \Phi, A, D, \overline{X_0}, \overline{W}, B_{1:R})}{P(I_0^{j} \mid \Phi, A, D, \overline{X_0}, \overline{W}, B_{1:R})} \frac{\text{Gamma}\left(I_0^j; \alpha_I^{Prop}, \frac{I_0^{j+1}}{\alpha_I^{Prop}}\right)}{\text{Gamma}\left(I_0^{j+1}; \alpha_I^{Prop}, \frac{I^j}{\alpha_I^{Prop}}\right)} \tag{57}$$

where the Gamma distribution can be used as proposal distribution:

$$I_0^{j+1} \sim \text{Gamma}\left(\alpha_I^{Prop}, \frac{I_0^j}{\alpha_I^{Prop}}\right). \tag{58}$$

6.5 Making Inference About $\mathcal{B}_r$

The target distribution of $\mathcal{B}_r$ is given by:

$$\begin{aligned} B_{1:R} &\sim P(B_{1:R} \mid \Phi, A, D, I_0, \overline{X_0}, \overline{W}) \propto \\ &P(\overline{W} \mid \Phi, A, D, I_0, \overline{X_0}, B_{1:R}) P(B_{1;R}) = \\ &\left[\prod_r \left[\prod_n \prod_m \prod_l \frac{\exp[-\Lambda_{nmr}^l](\Lambda_{nmr}^l)^{w_{nmr}^l}}{w_{nmr}^l!}\right] \text{Gamma}(B_r; \alpha_B, \beta_B)\right] \end{aligned} \tag{59}$$

Since the posterior (59) does not have a closed form, MH technique can be employed to draw samples:

$$A = \frac{P(B_{1:R}^{j+1} \mid \Phi, A, D, I_0, \overline{X_0}, \overline{W})}{P(B_{1:R}^{j} \mid \Phi, A, D, I_0, \overline{X_0}, \overline{W})} \frac{\text{Gamma}\left(B_{1:R}^j; \alpha_B^{Prop}, \frac{B_{1:R}^{j+1}}{\alpha_B^{Prop}}\right)}{\text{Gamma}\left(B_{1:R}^{j+1}; \alpha^{Prop}, \frac{B_{1:R}^j}{\alpha_B^{Prop}}\right)} \tag{60}$$

where the Gamma distribution can be used as a proposal distribution:

$$B_r^{j+1} \sim \text{Gamma}\left(\alpha_B^{Prop}, \frac{B_r^j}{\alpha_B^{Prop}}\right) \tag{61}$$

6.6 Making Inference About $\overline{X_0}$

The target distribution for $$X_{0,r=1}^{1:L}$$

is given by:

$$\begin{aligned} X_{0,r=1}^{1:L} &\sim P(X_{0,r=1}^{1:L} \mid \Phi, A, D, I_0, \overline{W}, B_{1:R}, X_{0,r=2}^{1:L}) \propto \\ &P(\overline{W} \mid \Phi, A, D, I_0, \overline{X}, B_{1:R}) P(X_{r=1}^1 \mid \vec{\mu}_0, \sigma^2) \prod_{l=2}^{L} P(X_{r=1}^l \mid X_{r=1}^{l-1}, D). \end{aligned} \tag{62}$$

Here, the particle's trajectory is sampled in the reference plane, i.e., r=1, and locations in other planes can be deterministically calculated.

The MH algorithm can be used to learn the particle track. New trajectories can be proposed by:

1) selecting a random frame and modifying the corresponding location:

$$X_{r=1}^{l,prop} \sim X_{r=1}^{l,old} + \text{Normal}(0, \sigma_X^2), \tag{63}$$

2) hit and run $$X_{r=1}^{1:L,prop} \sim X_{r=1}^{1:L,old} + \lambda \vec{u}_l \tag{64}$$

where $\vec{u}_l$ and $\lambda$ are, respectively, a unit vector with a random direction in space and the magnitude of the move in that direction. Note that the magnitude of the move in all directions are similar. The acceptance ratio of both jumps can be calculated as follows:

$$\mathbb{A} = \frac{\dfrac{P(\overline{W} \mid A, \Phi, D, I_0, \overline{X}_0^{prop}, B_{1:R})}{P(X_{r=1}^{1,prop} \mid \vec{\mu}_0, \sigma^2) \prod_{i=2}^{L} P(X_{r=1}^{prop} \mid X_{r=1}^{l-1,prop}, D)}}{\dfrac{P(\overline{W} \mid A, \Phi, D, I_0, \overline{X}_0^{old}, B_{1:R})}{P(\overline{X}_{r=1}^{1,old} \mid \vec{\mu}_0, \sigma^2) \prod_{i=2}^{L} P(X_{r=1}^{old} \mid X_{r=1}^{l-1,old}, D)}} \tag{65}$$

where the proposal distributions are canceled.

7 Multi-Plane Microscope Setup and Data Acquisition

Performance of the tracking and phase-retrieval method outlined herein is experimentally evaluated using a multi-plane epi-fluorescence microscope configured on a IX71 microscope (Olympus). In the illumination path of the microscope, a red laser (637 nm, OBIS) light is spatially filtered, expanded, and collimated. Wide-field illumination is achieved by focusing the collimated light at the back focal plane of a water immersion objective with high numerical aperture (UPLSAPO 60× 1.2 NA W; Olympus) using an achromatic doublet lens with a focal length of 300 mm. The fluorescence emission is collected by the same objective in the back-reflection and transmitted through a quad-band beam splitter (HC quadband laser beam-splitter R405/488/561/635, Semrock). A long-pass filter with the cut-off wavelength at 655 nm (Semrock) was used for further filtering the emission signal. In the detection path, a multi-plane prism is incorporated allowing to detect eight distinct but nearly equally-spaced image planes along the optical axis (the depth of sample).

These image planes exit the prism as two sets of four adjacent images. Accordingly, two sCMOS cameras (ORCA-Flash 4.0 V2, Hamamatsu) record the image planes synchronously. A further lateral magnification factor of 1.33 is achieved using a telescope system comprised of two lenses with focal lengths of 150 mm and 200 mm. A rectangular field stop is positioned at the focal plane of the microscope tube lens to adjust the field of view size and to prevent any cross-talk between the neighbouring images on cameras. An astigmatic aberration is introduced on the detection point spread function of the microscope by the incorporation of a cylindrical lens (50 mm of focal lens) positioned in the close vicinity of the rectangular field stop.

Brightness and inter-plane distance of the eight axial planes is measured by z-scanning the image of immobilised red fluorescence microspheres (FluoSpheres Carboxylate-Modified Microspheres, 0.2 μm, 625/645, Thermo Fisher Scientific, Waltham, MA) spin-coated on a clean glass coverslide. The average inter-plane distance and the standard deviation are correspondingly (370±32) nm. Image planes are axially co-aligned using image cross-correlation obtained by the bead calibration data.

7.1 Data Acquisition

Using the μManager software, movies were recorded with few thousand frames (10 ms of exposure time) from red fluorescence beads (FluoSpheres, Carboxylate-Modified Microspheres, 0.02 μm, 625/645, Thermo Fisher Scientific, Waltham, MA) diffusing randomly inside a mixture of glycerol and distilled water at room temperature. Three different volumetric ratio of solution components (75% glycerol+25% water, 80% glycerol+20% water, 90% glycerol+10% water) were used to obtain different diffusion coefficients. Particularly, the diffusion coefficients of nearly 390, 230, and $$70\frac{\text{nm}^2}{\text{ms}}$$

respectively were estimated using the above-mentioned solution ratios for diffusing spherical particles with 20 nm of diameter at 293K. Further, the same experiment was conducted using the same setup but in the absence of the cylindrical lens to collect negative control data.

7.2 Calibration Measurement on Pixel-To-Pixel Maps for Offset, Gain, and Variance of the Utilized sCMOS Camera To calibrate the pixel-to-pixel camera gain, movies were recorded with one thousand frames from the fluorescence signal of Atto 655 solution (with 100 nM of concentration) excited with different excitation laser powers (20%, 40%, 60%, 80%, and 100% of the maximum power) using the same experimental setup exploited for data acquisition. Furthermore, the pixel-to-pixel offset and variance maps were calibrated using the camera acquisition in the darkness (laser power set to zero).

Assuming the following noise model for CMOS cameras:

$$P(w^r_{nml} \mid \Lambda^r_{nml}, G, \epsilon^2_{nm}, O) = \sum_{\xi_{nm}} \text{Normal}(w^r_{nml}; G_{nm}\xi_{nm} - O_{nm}, \epsilon^2_{nm}) Poisson(\xi_{nm}, \Lambda^r_{nml}) \tag{66}$$

where $$G_{nm}, O_{nm}, \epsilon^2_{nm} \text{ and } \xi_{nm}$$

are, respectively, the pixel-dependent gain, offset, noise variance, and the number of photon reaching the nm-th pixel on the CMOS camera, which is marginalized out. The above noise model can be approximated as:

$$P(w^r_{nml} \mid \Lambda^r_{nml}, G, \epsilon^2_{nm}, O) \approx Poisson\left((w^r_{nml} - O_{nm})/G_{nm} + \epsilon^2_{nm}/G^2_{nm} \mid \Lambda^r_{nm} + \epsilon^2_{nm}/G^2_{nm}\right) \tag{67}$$

where the offset $O_{nm}$ is derived using the average of pixel values acquired in darkness. The offset $O_{nm}$ and noise variance $$\epsilon^2_{nm}$$

are obtained from the data acquired at darkness. The gain $$G^2_{nm}$$

is related to the temporal mean and variance (designated by $\overline{X}^j$ and $\overline{\Delta X}^{2,j}$ with j showing laser power of the data by:

$$\overline{\Delta X}^{2,j}_{nm} = G_{nm}(\overline{X}^j_{nm} - O_{nm}) + \epsilon^2_{nm}. \tag{68}$$

The gain can be solved from this equation at two different laser intensities.

8. Results

Figures 6A, 6B, 6C, 6D, 6E:
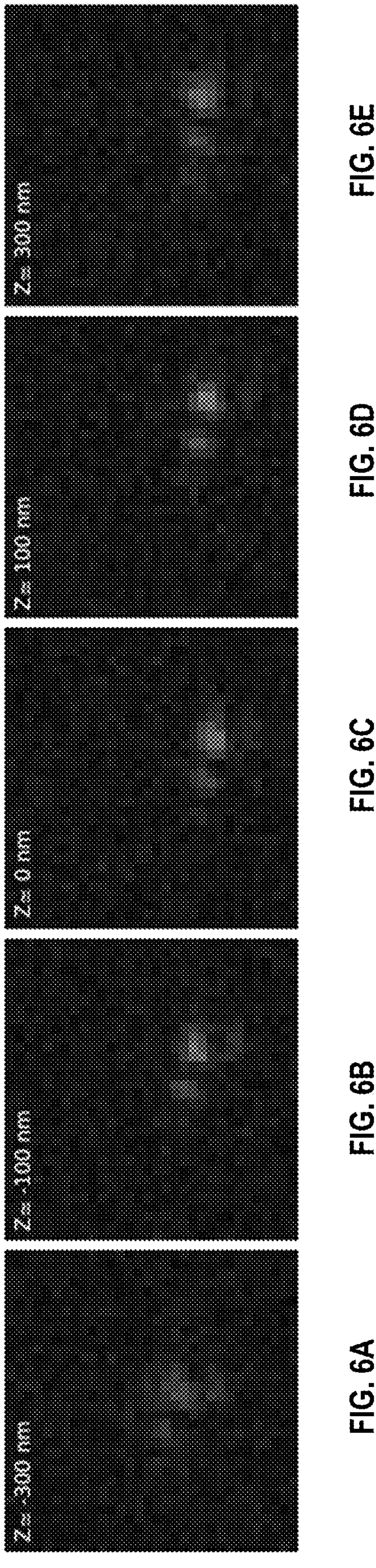
FIGS. 6A-6O show results from simultaneous phase retrieval and particle tracking using synthetic data.
Figure 6F:
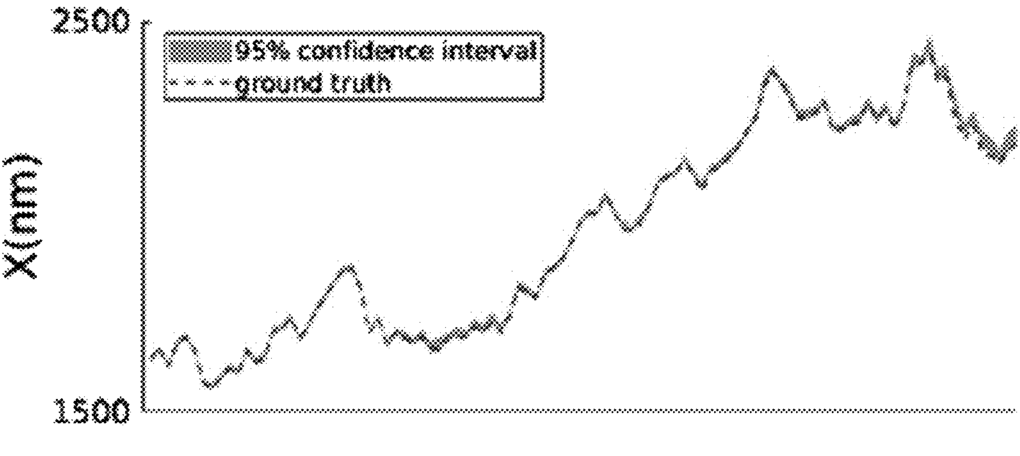
Figure 6G:
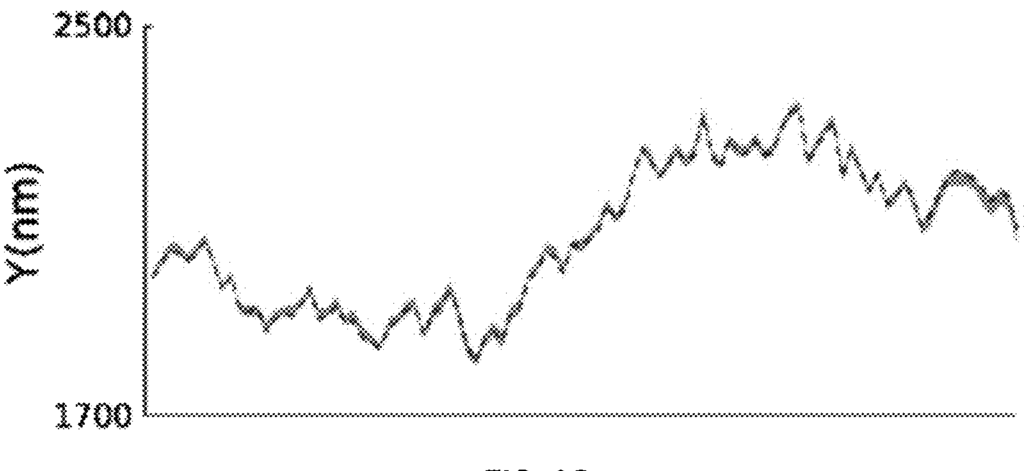
Figure 6H:
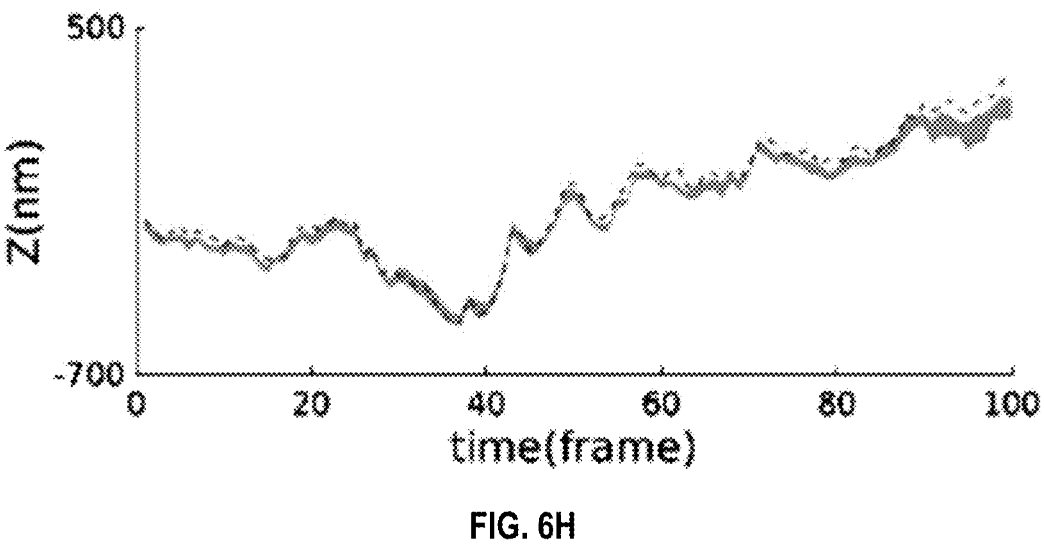
Figures 6I, 6J, 6K, 6L:
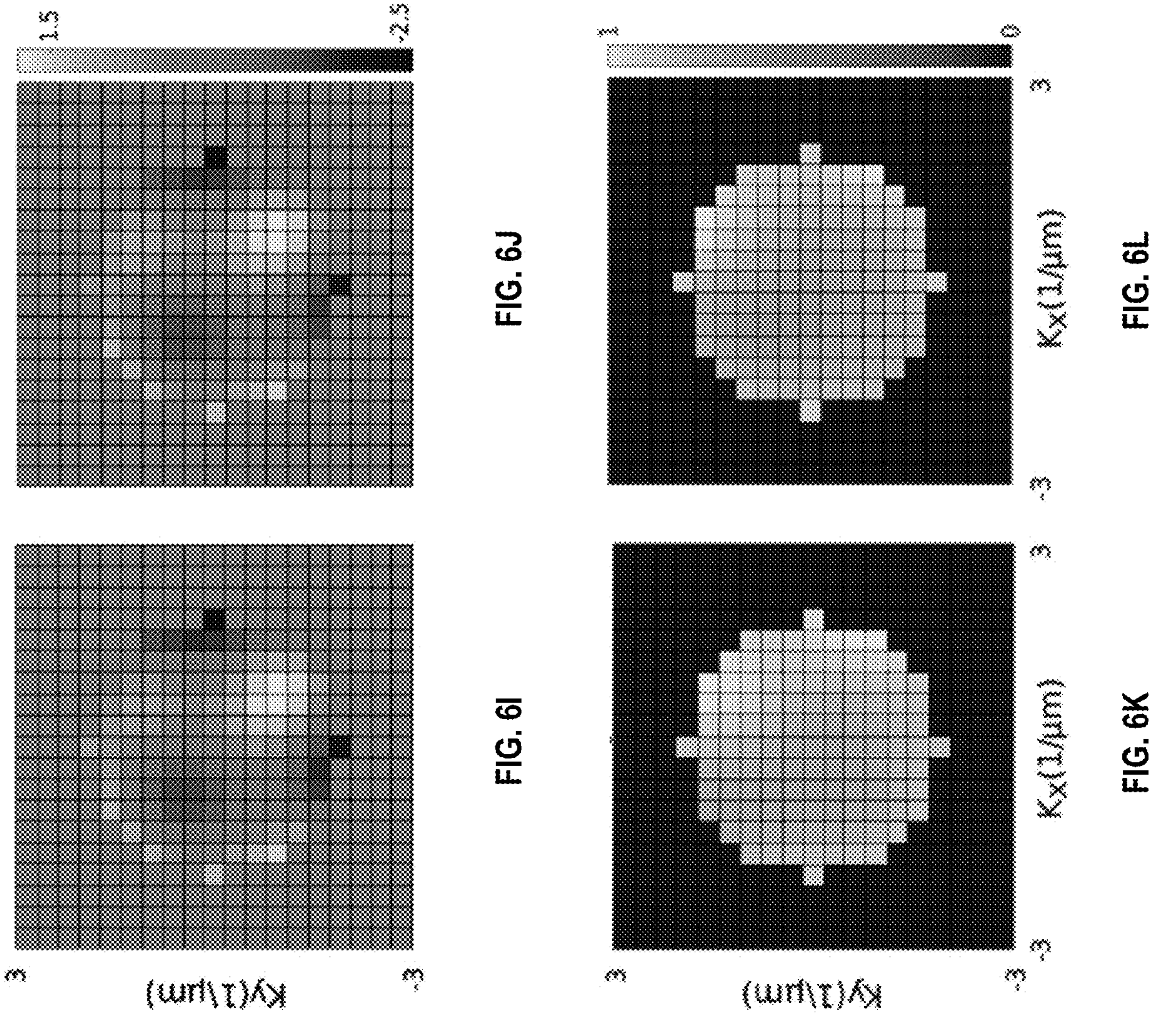
Figures 6M, 6N, 6O:
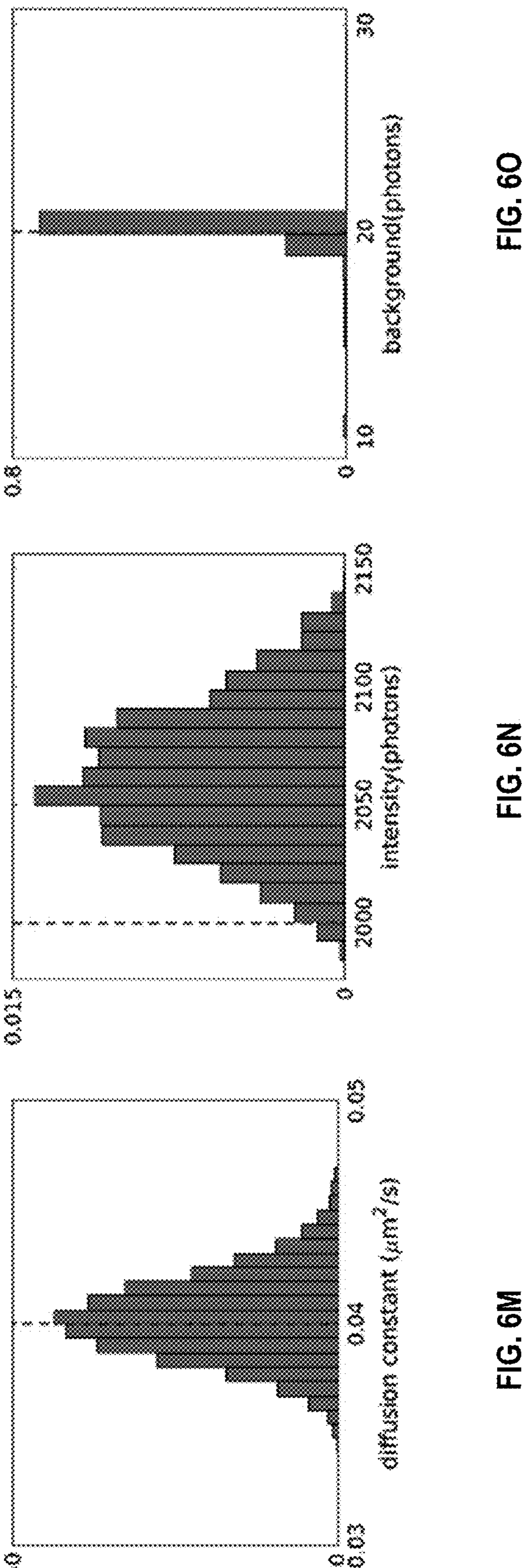

FIGS. 6A-6L show simultaneous phase retrieval and particle tracking using synthetic data simulated with diffusion constant of 0.04 μm²/s, an intensity of 2000 photons per frame, a background of 20 photons per pixel, and 100 frames of 32×32 pixels from each plane. In particular, FIGS. 6A-6E show examples of simulated PSFs at different locations. FIG. 6F shows an X-trajectory, FIG. 6G shows a Y-trajectory and FIG. 6H shows a Z-trajectory. FIG. 6I shows a ground truth pupil phase, while FIG. 6J shows a pupil phase found using the methods outlined herein. Similarly, FIG. 6K shows a ground truth pupil amplitude, while FIG. 6L shows a pupil amplitude found using the methods outlined herein. FIG. 6M shows a histogram of sampled diffusion coefficients, FIG. 6N shows a histogram of sampled particle intensities, and FIG. 6O shows a histogram of sampled background. In FIGS. 6M-6O, red dashed lines indicate ground truths.

Figures 7A, 7B, 7C, 7D, 7E:
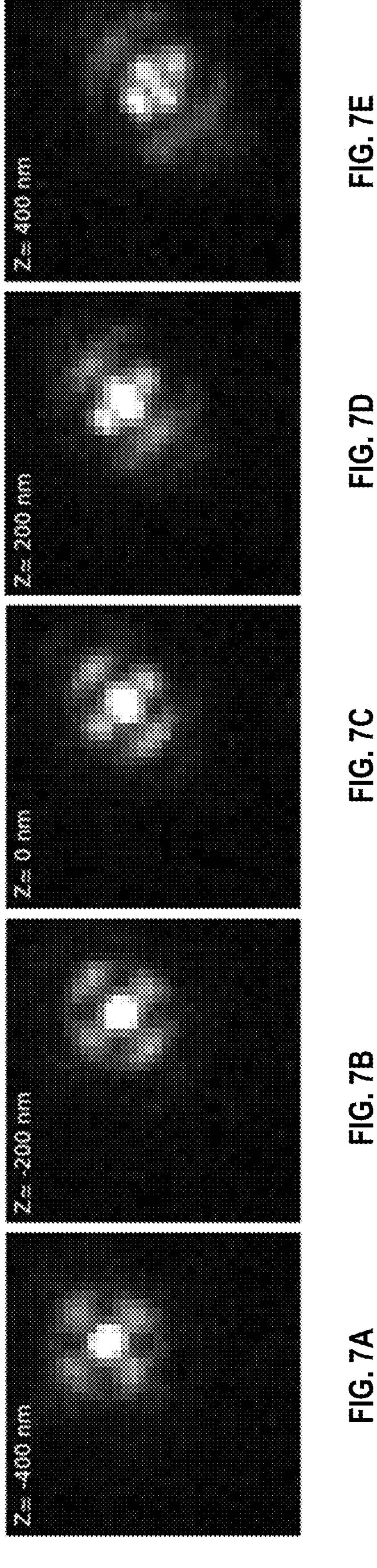
FIGS. 7A-7M show results from simultaneous phase retrieval and particle tracking using in vitro data acquired from diffusing beads with 100 nm diameter within 80% glycerol solution, a camera exposure time of 20 ms and induced secondary astigmatic aberration on top of aberrations due to optical setup.
Figure 7F:
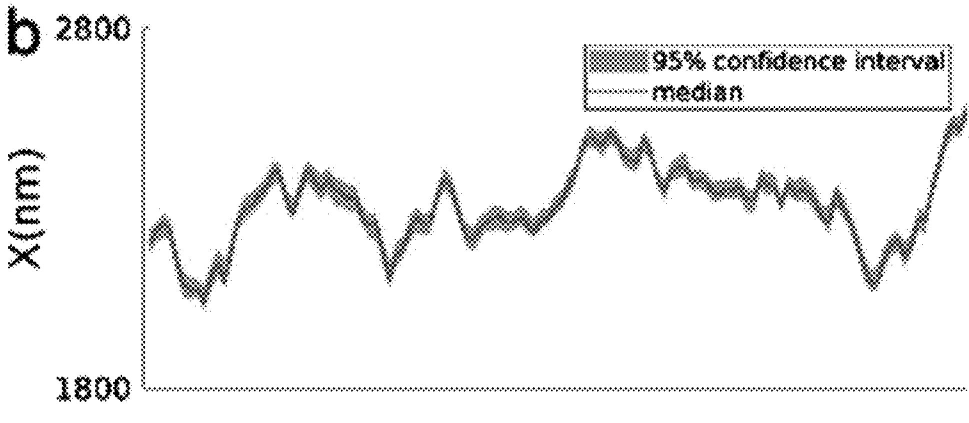
Figure 7G:
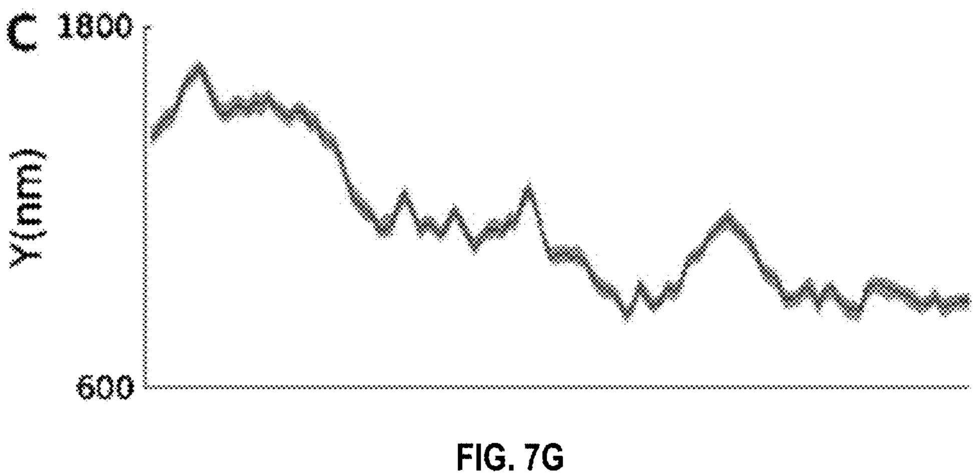
Figure 7H:
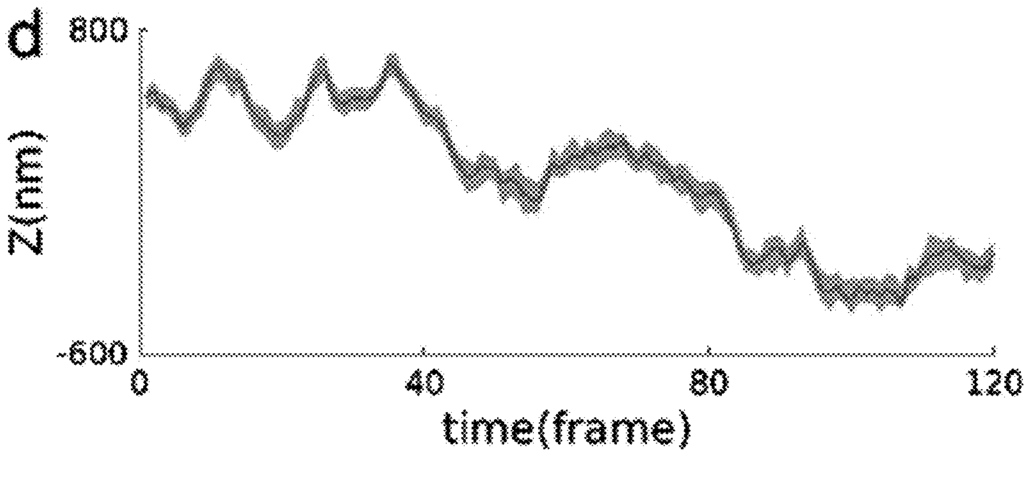
Figure 7I:
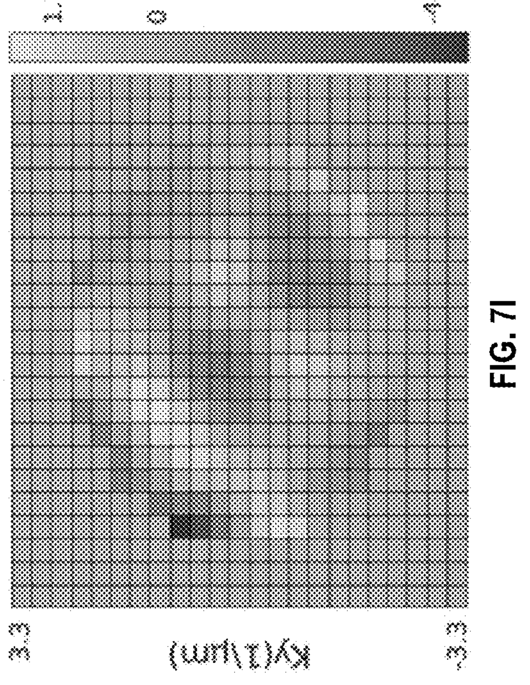
Figure 7J:
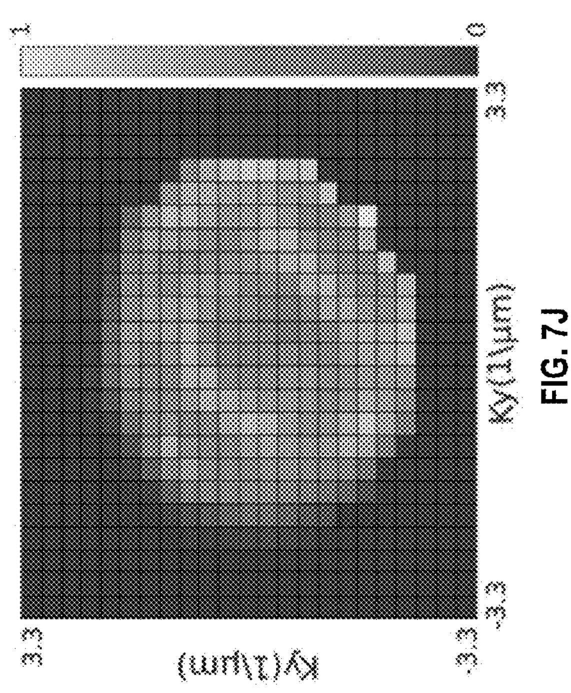
Figures 7K, 7L, 7M:
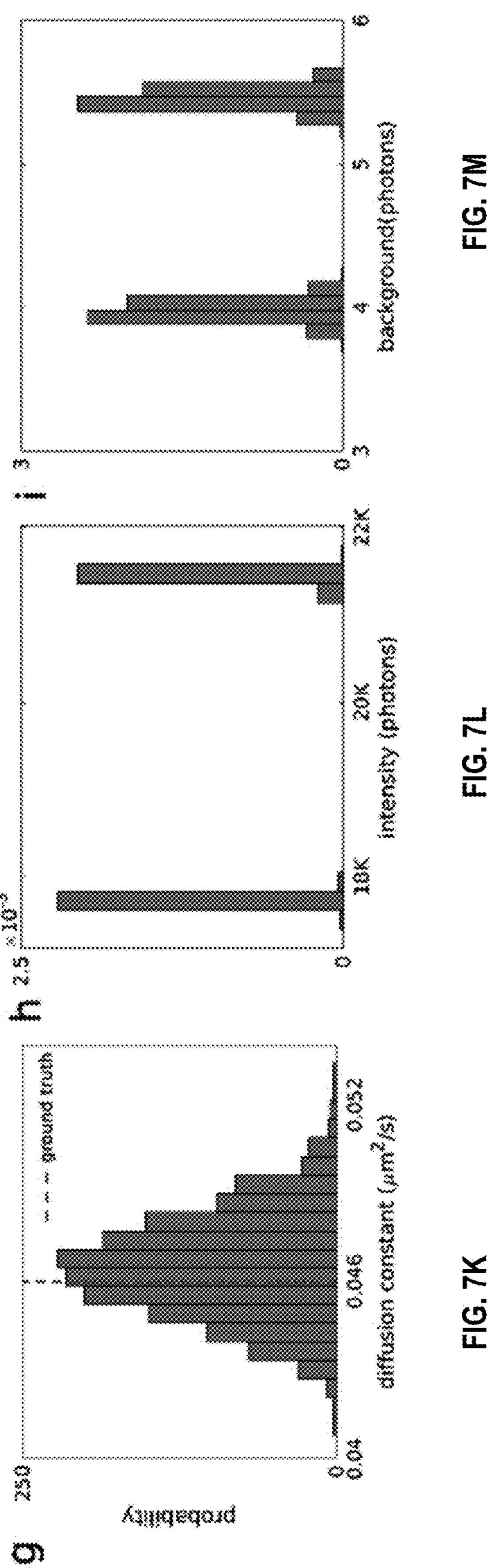

FIGS. 7A-7M show simultaneous phase retrieval and particle tracking using in vitro data acquired from diffusing beads with 100 nm diameter within 80% glycerol solution, a camera exposure time of 20 ms and induced secondary astigmatic aberration on top of aberrations due to optical setup. FIGS. 7A-7E show examples of simulated PSFs at different locations. FIG. 7F shows an X-trajectory, FIG. 7G shows a Y-trajectory and FIG. 7H shows a Z-trajectory. FIG. 7I shows a pupil phase found using the methods outlined herein, and FIG. 7J shows a pupil amplitude found using the methods outlined herein. FIG. 7K shows a histogram of sampled diffusion coefficients. The red dashed line indicates the ground truth diffusion constant calculated using Stokes-Einstein diffusion equation for 80% glycerol solution at room temperature. FIG. 7L shows a histogram of sampled particle intensities. FIG. 7M shows a histogram of sampled background.

Figures 8A, 8B, 8C, 8D, 8E:
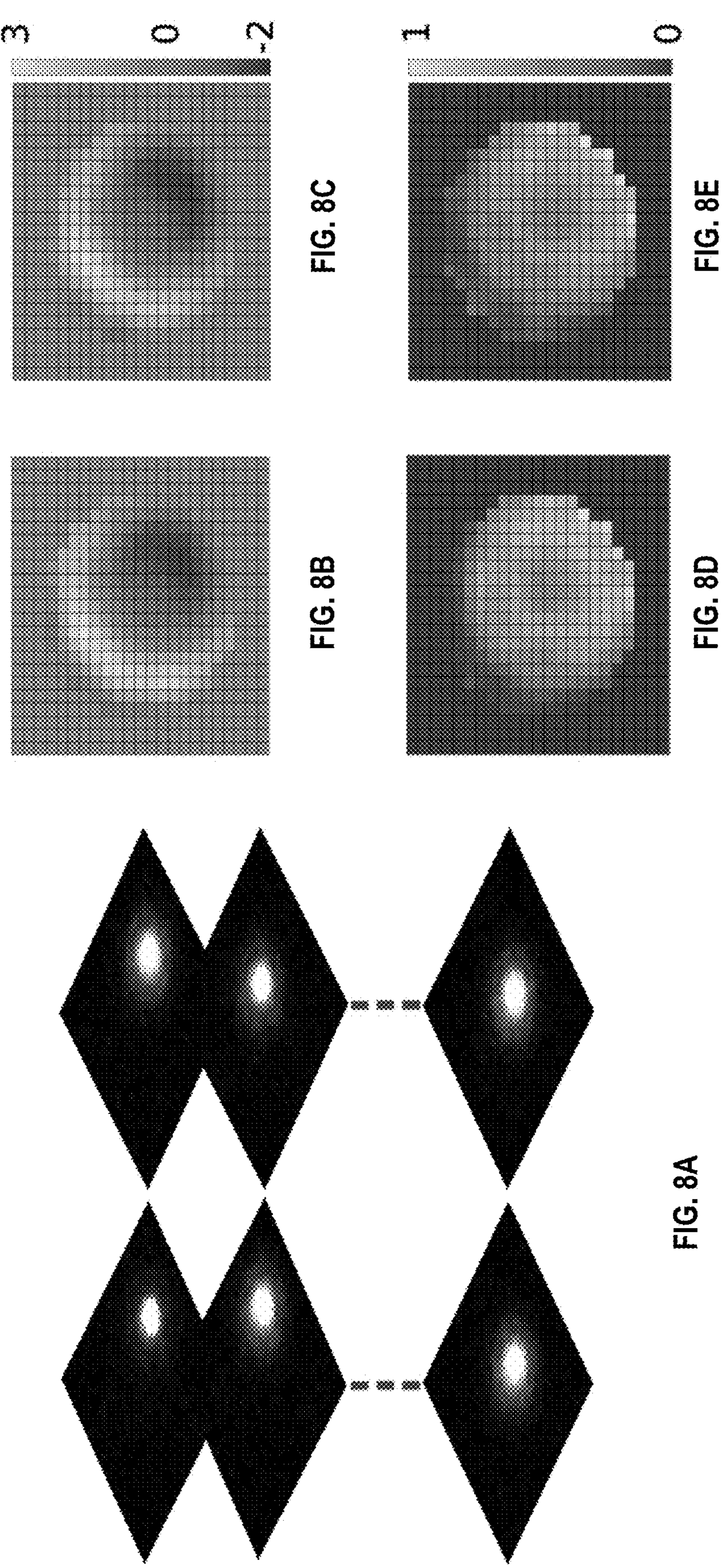
FIGS. 8A-8O show results from simultaneous phase retrieval and particle tracking using in vitro data acquired from a bi-plane setup using 100 nm beads diffusing within 80% glycerol solution, a camera exposure time of 20 ms and various induced aberrations.
Figures 8F, 8G, 8H, 8I, 8J:
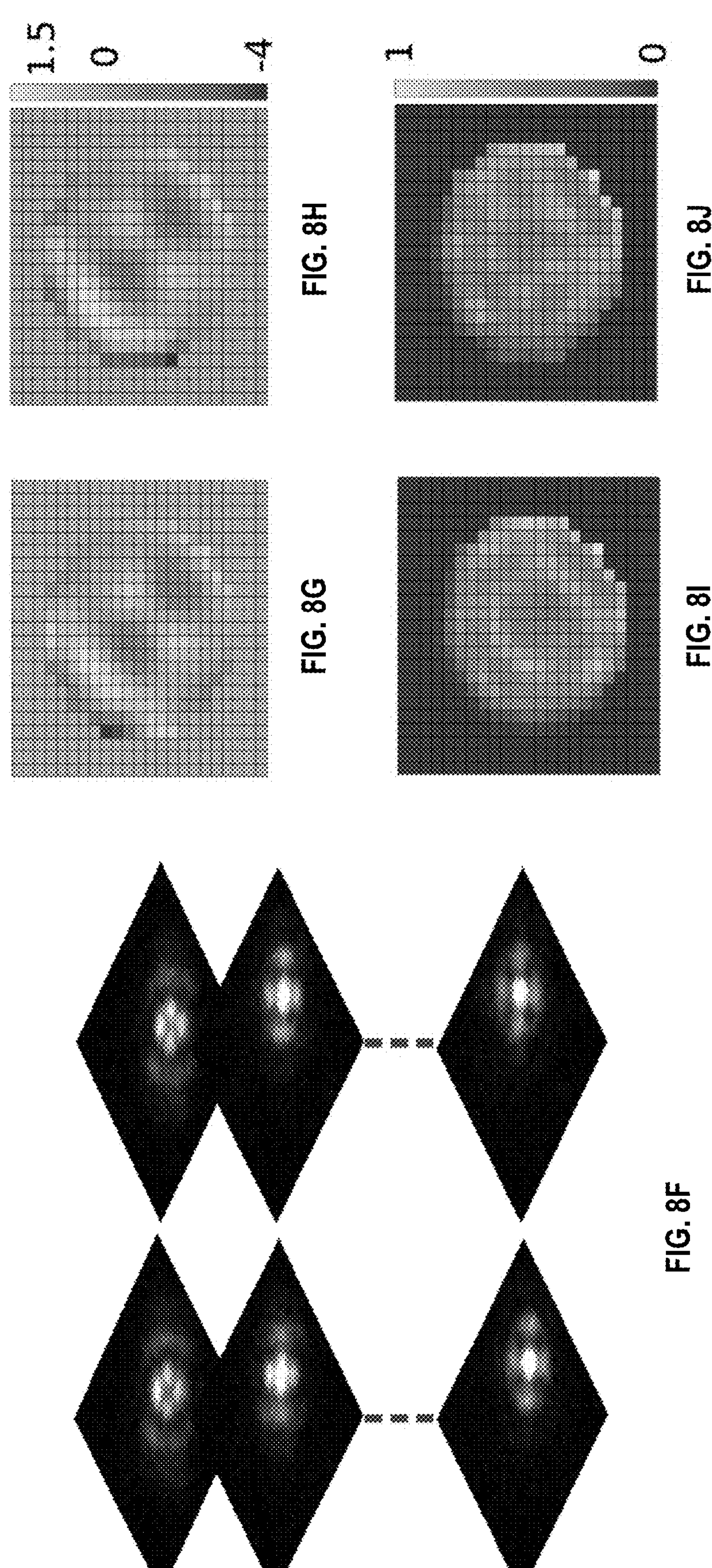
Figures 8K, 8L, 8M, 8N, 8O:
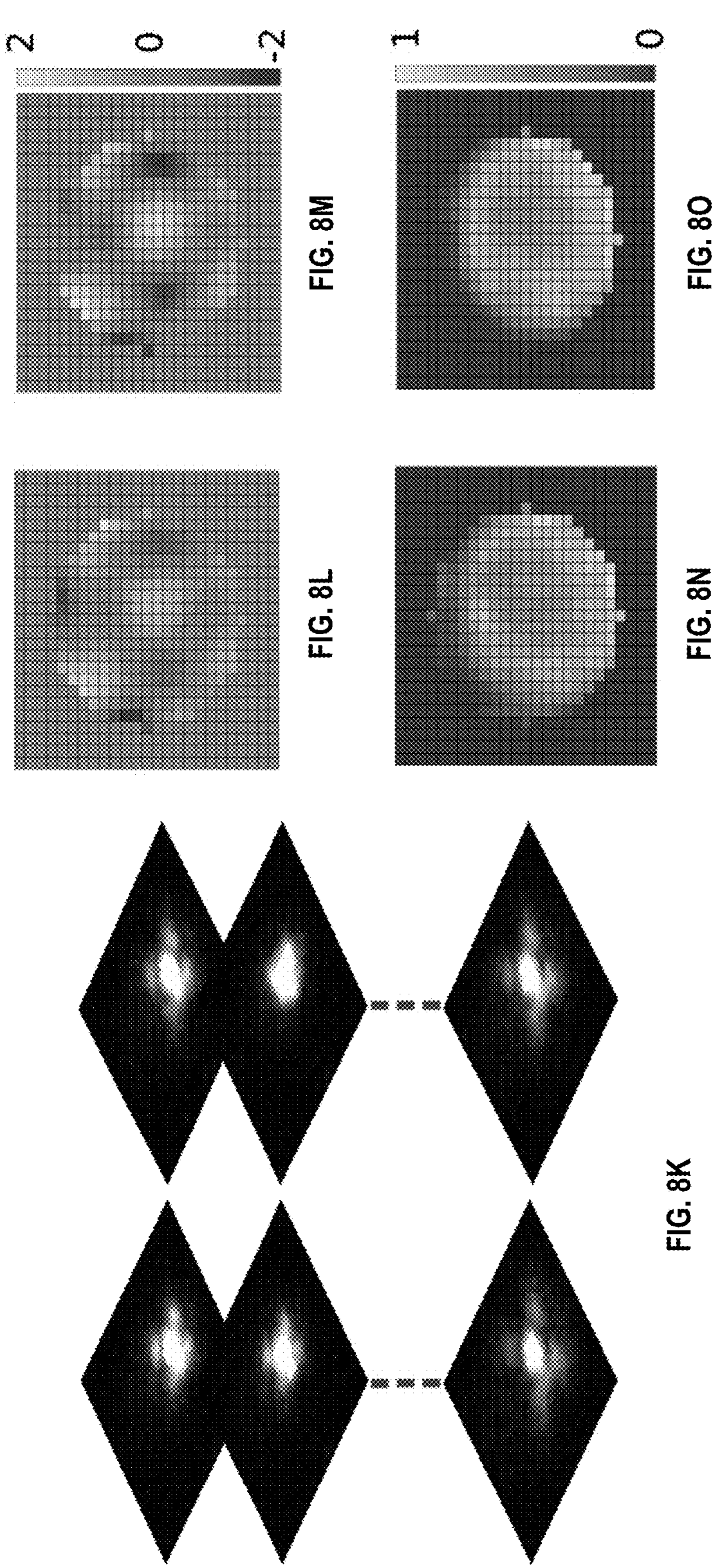

FIGS. 8A-8O show simultaneous phase retrieval and particle tracking using in vitro data acquired from a bi-plane setup using 100 nm beads diffusing within 80% glycerol solution, a camera exposure time of 20 ms and various induced aberrations.

FIG. 8A shows an example of frame sequences acquired using a bi-plane setup with no induced aberration. FIGS. 8B and 8C show pupil phases obtained from two different 120 frames chunks of the sequence shown in FIG. 8A. FIGS. 8D and 8E show pupil amplitudes obtained from two different 120 frames chunks of the sequence shown in FIG. 8A.

FIG. 8F shows an example of frame sequences acquired using a bi-plane setup with secondary astigmatic induced aberration. FIGS. 8G and 8H show pupil phases obtained from two different 120 frames chunks of the sequence shown in FIG. 8F. FIGS. 8I and 8J show pupil amplitudes obtained from two different 120 frames chunks of the sequence shown in FIG. 8F.

FIG. 8K shows example of frame sequences acquired using a bi-plane setup with three different induced aberration including: primary astigmatic, Coma and Quadrafoil. FIGS. 8L and 8M show pupil phases obtained from two different 120 frames chunks of the sequence shown in FIG. 8K. FIGS. 8N and 8O show pupil amplitudes obtained from two different 120 frames chunks of the sequence shown in FIG. 8K.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:

a processor in communication with a memory, the memory including instructions executable by the processor to:

access observation data including brightness data indicative of one or more light-emitting particles captured across a plurality of frames and across a plurality of planes by an imaging device, the plurality of frames having an aberration profile observable across each frame of the plurality of frames;

sample a set of joint probability values associated with observing the observation data for values of each respective parameter of a plurality of parameters of a measurement model, the plurality of parameters including:

a particle trajectory for each respective light-emitting particle of the one or more light-emitting particles across the plurality of frames; and a set of point spread function parameters of a point spread function of the imaging device;

and jointly infer, based on the set of joint probability values and the observation data, a set of most probable values of the plurality of parameters; and sample probabilities associated with a background photon count per pixel for each frame of the plurality of frames using a Metropolis-Hasting procedure at each iteration of a Markov Chain Monte Carlo procedure.

2. The system of claim 1, the set of point spread function parameters including:

an amplitude and a phase of a pupil function associated with the aberration profile and the point spread function of the imaging device.

3. The system of claim 1, the plurality of parameters further including one or more of:

a diffusion coefficient;

a particle photon emission rate; and a background photon count per pixel.

4. The system of claim 1, the memory including instructions executable by the processor to:

apply the Markov Chain Monte Carlo procedure to iteratively sample probability values associated with values of each respective parameter of the measurement model over a plurality of iterations.

5. The system of claim 1, the memory including instructions executable by the processor to:

sample probabilities associated with an amplitude and a phase of a pupil function over the plurality of frames from respective amplitude and phase posterior probability distributions using the Metropolis-Hasting procedure at each iteration of the Markov Chain Monte Carlo procedure.

6. The system of claim 5, wherein the amplitude and phase posterior probability distributions are respectively obtained through application of Gaussian priors on the amplitude and phase of the pupil function.

7. The system of claim 1, the memory including instructions executable by the processor to:

sample probabilities associated with particle trajectories over the plurality of frames from a particle trajectory posterior probability distribution using a hit-and-run sampler at each iteration of the Markov Chain Monte Carlo procedure.

8. The system of claim 1, the memory including instructions executable by the processor to:

sample a probability associated with a diffusion coefficient directly from a posterior probability distribution of the measurement model at each iteration of the Markov Chain Monte Carlo procedure.

9. The system of claim 1, the memory including instructions executable by the processor to:

sample probabilities associated with a particle photon emission rate from a light-emitting particle of the one or more light-emitting particles for each frame of the plurality of frames using the Metropolis-Hasting procedure at each iteration of the Markov Chain Monte Carlo procedure.

10. The system of claim 1, where the measurement model simultaneously considers each frame of the plurality of frames.

11. A method, comprising:

accessing observation data including brightness data indicative of one or more light-emitting particles captured across a plurality of frames and across a plurality of planes by an imaging device, the plurality of frames having an aberration profile observable across each frame of the plurality of frames;

sampling a set of joint probability values associated with observing the observation data for values of each respective parameter of a plurality of parameters of a measurement model, the plurality of parameters including:

a particle trajectory for each respective light-emitting particle of the one or more light-emitting particles across the plurality of frames;

a set of point spread function parameters of a point spread function of the imaging device; and jointly inferring, based on the set of joint probability values and the observation data, a set of most probable values of the plurality of parameters; and sampling probabilities associated with a background photon count per pixel for each frame of the plurality of frames using a Metropolis- Hasting procedure at each iteration of a Markov Chain Monte Carlo procedure.

12. The method of claim 11, the plurality of parameters further including one or more of:

a diffusion coefficient;

a particle photon emission rate; and a background photon count per pixel.

13. The method of claim 11, further comprising:

applying the Markov Chain Monte Carlo procedure to iteratively sample probability values associated with values of each respective parameter of the measurement model over a plurality of iterations.

14. The method of claim 11, further comprising:

sampling probabilities associated with an amplitude and a phase of a pupil function over the plurality of frames from respective amplitude and phase posterior probability distributions using the Metropolis-Hasting procedure at each iteration of the Markov Chain Monte Carlo procedure.

15. The method of claim 14, the amplitude and phase posterior probability distributions being respectively obtained through application of Gaussian priors on the amplitude and phase of the pupil function.

16. The method of claim 11, further comprising:

sampling probabilities associated with particle trajectories over the plurality of frames from a particle trajectory posterior probability distribution using a hit-and-run sampler at each iteration of the Markov Chain Monte Carlo procedure.

17. The method of claim 11, further comprising:

sampling a probability associated with a diffusion coefficient directly from a posterior probability distribution of the measurement model at each iteration of the Markov Chain Monte Carlo procedure.

18. The method of claim 11, further comprising:

sampling probabilities associated with a particle photon emission rate from a light-emitting particle of the one or more light-emitting particles for each frame of the plurality of frames using the Metropolis-Hasting procedure at each iteration of the Markov Chain Monte Carlo procedure.

* * * * *